United States Patent
Vasiliauskas et al.

(10) Patent No.: US 11,831,726 B2
(45) Date of Patent: *Nov. 28, 2023

(54) CURATING PROXY SERVER POOLS

(71) Applicant: OXYLABS, UAB, Vilnius (LT)

(72) Inventors: Justas Vasiliauskas, Vilnius (LT); Justas Gervinskas, Vilnius (LT)

(73) Assignee: OXYLABS, UAB, Vilnius (LT)

( * ) Notice: Subject to any disclaimer, the term of this patent is extended or adjusted under 35 U.S.C. 154(b) by 0 days.

This patent is subject to a terminal disclaimer.

(21) Appl. No.: 18/165,444

(22) Filed: Feb. 7, 2023

(65) Prior Publication Data
US 2023/0188611 A1    Jun. 15, 2023

Related U.S. Application Data

(63) Continuation of application No. 17/654,083, filed on Mar. 9, 2022, now Pat. No. 11,637,902, which is a
(Continued)

(51) Int. Cl.
*H04L 67/2866* (2022.01)
*H04L 41/5019* (2022.01)
(Continued)

(52) U.S. Cl.
CPC ........... *H04L 67/2866* (2013.01); *G06N 5/01* (2023.01); *H04L 41/5019* (2013.01); *H04L 43/0817* (2013.01); *H04L 63/0281* (2013.01); *H04L 67/561* (2022.05); *H04L 67/562* (2022.05); *H04L 67/564* (2022.05)

(58) Field of Classification Search
CPC . H04L 67/2866; H04L 67/562; H04L 67/564; H04L 67/561; H04L 41/5019; H04L 43/0817; H04L 63/0281; G06N 5/01
See application file for complete search history.

(56) References Cited

U.S. PATENT DOCUMENTS 7,027,418 B2    4/2006 Gan et al.
9,058,362 B2    6/2015 Vijayaraghavan et al.
(Continued)

OTHER PUBLICATIONS

S. Bradner and J. McQuaid (RFC 2544—Benchmarking Methodology for Network Interconnect Devices), https://tools.ietf.org/html/ref2544, pp. 1-32, Mar. 1999.
(Continued)

*Primary Examiner* — Joseph L Greene
(74) *Attorney, Agent, or Firm* — FISHERBROYLES, LLP; Keats Quinalty

(57) ABSTRACT

A system and method of forming proxy server pools is provided. The method comprises several steps, such as requesting a pool to execute the user's request and retrieving an initial group. The system checks the service history of an initial group, including whether any of the proxy servers in an initial group are exclusive to existing pools. The exclusive proxy servers in an initial group with eligible proxy servers are replaced when needed and new proxy server pools are formed. The system also records the service history of proxy servers and pools before and after the pools are created. The method can also involve predicting the pool health in relation with the thresholds foreseen and replacing the proxy servers below the threshold.

17 Claims, 10 Drawing Sheets

Related U.S. Application Data continuation of application No. 17/303,616, filed on Jun. 3, 2021, now Pat. No. 11,310,336, which is a continuation of application No. 17/006,499, filed on Aug. 28, 2020, now Pat. No. 11,463,536.

(51) Int. Cl.

| | | |
|---|---|---|
| *H04L 9/40* | (2022.01) | |
| *H04L 67/562* | (2022.01) | |
| *G06N 5/01* | (2023.01) | |
| *H04L 67/564* | (2022.01) | |
| *H04L 67/561* | (2022.01) | |
| *H04L 43/0817* | (2022.01) | |

(56) References Cited

U.S. PATENT DOCUMENTS

| | | | |
|---|---|---|---|
| 9,348,936 B2 | 5/2016 | B'Far et al. | |
| 10,372,781 B2 | 8/2019 | B'Far et al. | |
| 10,735,540 B1 | 8/2020 | Sharma | |
| 10,848,574 B2 | 11/2020 | Battle et al. | |
| 11,233,847 B1 | 1/2022 | Vaccari et al. | |
| 2008/0201414 A1 | 8/2008 | Amir Husain et al. | |
| 2009/0113399 A1* | 4/2009 | Tzoref ............... | G06F 11/3644 717/130 |
| 2013/0117359 A1 | 5/2013 | Husain et al. | |
| 2015/0100943 A1 | 4/2015 | Gabel et al. | |
| 2015/0195149 A1 | 7/2015 | Vasseur et al. | |
| 2016/0105523 A1 | 4/2016 | Dowdell | |
| 2016/0337264 A1 | 11/2016 | Murashko et al. | |
| 2017/0099658 A1 | 4/2017 | Shattil | |
| 2017/0180401 A1 | 6/2017 | Hentunen | |
| 2017/0237601 A1 | 8/2017 | Zhu et al. | |
| 2018/0314700 A1 | 11/2018 | Liu | |
| 2019/0230004 A1 | 7/2019 | Zhou et al. | |
| 2019/0371463 A1* | 12/2019 | Asthana ............... | G16H 50/20 |
| 2019/0391980 A1 | 12/2019 | Mundar | |
| 2020/0067789 A1 | 2/2020 | Khuti et al. | |
| 2020/0099592 A1* | 3/2020 | Mahindru ........... | H04L 41/5019 |
| 2020/0137023 A1* | 4/2020 | Andrew ............... | H04L 43/0817 |
| 2020/0183723 A1* | 6/2020 | Sabev .................. | G06F 9/5077 |
| 2020/0382387 A1 | 12/2020 | Pasupathy et al. | |
| 2021/0029248 A1 | 1/2021 | Scodary et al. | |
| 2021/0051210 A1 | 2/2021 | Chen | |
| 2021/0151056 A1* | 5/2021 | Trim .................... | G10L 13/027 |
| 2021/0157312 A1 | 5/2021 | Cella et al. | |
| 2021/0314238 A1 | 10/2021 | Cioffi et al. | |

OTHER PUBLICATIONS

S. Bradner, et al. (RFC 6815—Applicability Statement for RFC 2544: Use of Production Networks Considered Harmful), https://tools.ietf.org/html/rfc6815, pp. 1-12, Nov. 2012.

Ethernet service activation test methodology, Y. 1564 Series Y: Global Information Infrastructure, Internet Protocol Aspects and Next-Generation Networks, Internet of Things and Smart Cities, Internet protocol aspects—Quality of service and network performance, International Telecommunication Union, Telecommunication Standardization Sector of ITU, Rec. ITU-T Y. 1564 (Feb. 2016), 38 pages.

Chung, Taejoong et al. (Tunneling for Transparency: A Large-Scale Analysis of End-to-End Violations in the Internet), Northeastern University, pp. 202-2-4 (Year: 2016).

* cited by examiner

CURATING PROXY SERVER POOLS

CROSS-REFERENCE TO RELATED APPLICATIONS

This application is a continuation of U.S. patent application Ser. No. 17/654,083, filed Mar. 9, 2022, which is a continuation of U.S. patent application Ser. No. 17/303,616, filed Jun. 3, 2021, now U.S. Pat. No. 11,310,336, which issued Apr. 19, 2022, and is a continuation of U.S. patent application Ser. No. 17/006,499, filed Aug. 28, 2020, now U.S. Pat. No. 11,463,536, which issued Oct. 4, 2022, the content of each of which are incorporated herein in their entirety as if repeated herein.

FIELD OF THE INVENTION

The disclosure belongs to the area of data scraping. More specifically, the disclosures present an efficient way to analyze the history of the exit nodes, organized in groups, or pools, and predict their performance and behavior as a group to receive advanced web scraping results.

BACKGROUND OF THE INVENTION

A proxy server acts as an intermediary for requests from the user seeking resources from target servers. A user connects to the proxy server, requesting data. The proxy server evaluates the request and forwards the request to the actual target system or systems containing the corresponding data. After obtaining the data, the proxy server normally forwards the data to the original requestor, but other actions can also be performed by the proxy (e.g., return error message, etc.). Depending on the type of request, a proxy server may or may not have full visibility into the actual content fetched to the original requestor, e.g., in case of an encrypted Hypertext Transfer Protocol Secure (HTTPS) session, the proxy may serve as an intermediary, blindly forwarding the data without being aware of what is being forwarded.

The proxies can be divided into different types depending on what functions are provided or what servers are used. The proxies can also be divided into Residential Internet Protocol (IP) proxies, Datacenter IP proxies, and Mobile IP proxies. A Residential IP address is an address from the range specifically designated by the owning party as assigned to private customers. Usually a Residential proxy is an IP address linked to a physical device, for example, mobile phone or desktop computer, however businesswise the blocks of Residential IP addresses may be bought from the owning Proxy Service Provider by another company directly, in bulk. The real owners of the Residential IP address ranges, namely Internet service providers (ISPs), register residential IP addresses in public databases, which allows websites to determine a device's internet provider, network, and location. Datacenter IP proxy is the proxy server assigned with a datacenter IP. Datacenter IPs are IPs owned by companies, not by individuals. The datacenter proxies are actually IP addresses that are not located in a natural person's home. Instead, the datacenter proxies are associated with a secondary corporation. Mobile IP proxies may be considered a subset of the Residential proxy category. A mobile IP proxy is essentially one IP address that is obtained from mobile operators. Mobile IP proxies use mobile data, as opposed to a residential proxy that uses broadband ISPs or home Wi-Fi. When a user sends a request, the request goes to the proxy server first. The proxy server then makes the request on the user's behalf, collects the response from the web server, and forwards the web page data so that the user can access the page. When the proxy server forwards the requests, it can make changes to the data but yet still provide the data requested. A proxy server changes the user's IP address, so the web server is not provided with the geographical location of the user. A proxy can encrypt the user's data so that the user's data becomes unreadable in transit. Also, a proxy server can block access to certain web pages, based on IP address, domain name, or the communication protocol parameters, such as the port requested.

Exit node proxies, or simply exit nodes, are gateways where the traffic hits the Internet. There can be several proxies used to perform a user's request, but the exit node proxy is the final proxy that contacts the target and forwards the information from the target to the user. There can be several proxies serving the user's request, forming a proxy chain, passing the request through each proxy, with the exit node being the last link in the chain that ultimately passes the request to the target.

In the current embodiments, proxies and exit nodes can be used as synonyms. The current embodiments are not limited only to the exit nodes and same technologies can be used for proxies of different types. However, the term exit node is employed in the current description to clarify the functional differences between exit nodes and proxies.

A proxy provider can control the quality of proxies and decide which IP addresses are going to be used for users in a set of proxies. If the same proxy is used for too many requests, it will ultimately be banned by the ISP or the web page and it will not be possible to use such a proxy to make subsequent requests. If too many requests come in from one IP address in a short period of time, then the site will block the requests from that proxy for a pre-set period of time.

This problem is most often encountered in web scraping. Web scraping (also known as screen scraping, data mining, web harvesting) in its most general sense is the automated gathering of data from the internet. More technically, it is the practice of gathering data from the internet through any means other than a human using a web browser or a program interacting with an application programming interface (API). Web scraping is usually accomplished by writing a program that queries a web server and requests data automatically, then parses the data to extract the requested information.

Web scrapers—programs written for web scraping can have a significant advantage over other means of accessing information, like web browsers. The latter are designed to present the information in a readable way for humans, whereas web scrapers are excellent at collecting and processing large amounts of data quickly. Rather than opening one page at a time through a monitor (as web browsers do), web scrapers are able to view large databases consisting of thousands or even millions of pages at once.

Sometimes the website allows another automated way to transfer its structured data from one program to another via an API. Typically, a program will make a request to an API via Hypertext Transfer Protocol (HTTP) for some type of data, and the API will return this data from the website in the structured form. It serves as a medium to transfer the data. However, using APIs is not considered web scraping since the API is offered by the website (or a third party) and it removes the need for web scrapers.

An API can transfer well-formatted data from one program to another and the process of using it is easier than building a web scraper (a bot) to get the same data. However, APIs are not always available for the needed data. Also, APIs often use volume and rate restrictions and limit the types and the format of the data. Thus, a user would use web scraping for the data for which an API does not exist or which is restricted in any way by the API.

Usually, web scraping includes the following steps: retrieving Hypertext Markup Language (HTML) data from a website; parsing the data for target information; saving target information; repeating the process if needed on another page. A program that is designed to do all of these steps is called a web scraper. A related program—a web crawler (also known as a web spider)—is a program or an automated script which performs the first task, i.e. it navigates the web in an automated manner to retrieve raw HTML data of the accessed web sites (the process also known as indexing).

There are techniques that websites use to stop or slow down a bot since scraping may overload the website. For example, they may try to identify the IP address of the bot and block it to prevent further access by the bot. To do that, the website needs to identify the bot-like behavior of the web scraper and to identify its IP address.

Recognizing the bot-like behavior can be done in multiple ways. One involves a limit on the rate of actions (or actions over time) since humans normally perform less actions than a bot would. To circumvent this, web scrapers often choose to employ proxies which mask the real IP address of the web scraper and perform web scraping through multiple proxy IP addresses at the same time to both keep up the gathering speed and avoid being blocked.

Another instance, in which the quality of the proxy is important is media streaming. Media can be distributed on the internet in one of three ways: full download, progressive download, and streaming. Full download has the disadvantage of having to wait until the download is complete to view the media. It is only usable for non-real-time media. Progressive download is applied to the parts of the media progressively, so the user can begin viewing the media before it is fully downloaded. Progressive download is another method for non-real-time media distribution because a significant pre-load is usually required to begin viewing the media. Streaming, conversely, is real-time media distribution. It works by filling out a playout buffer at the client (usually a few seconds) and playing from the buffer as soon as it fills up. The advantage of streaming is almost instantaneous distribution of the media content.

However, streaming is extremely susceptible to network impairments, like packet loss and jitter. More specifically, if the rate of transmission of the media is lower than the playback rate, the playback buffer runs out and the media freezes until the buffer is filled out again.

Media streaming companies strive to offer an uninterrupted experience to its users. They want playback to start instantly and to not stop unexpectedly in any network environment. One way to do that is to reduce the buffer size by compressing the media in more efficient ways. The other way is to ensure that the connection is stable and reliable and the servers can handle the load.

A key issue in media streaming is connection reliability. Reliability, formally speaking, is the ability of the connection to function under stated conditions for a period of time. Put simply, reliability means a connection should work and continue working in a way that supports continuous streaming of the media.

The same criteria apply to proxy connections. When a proxy user requests media streaming, the proxy can become the bottleneck for the user's connection. This means that the proxy user's media streaming connection will be as fast and as reliable, as the exit node's connection is. Thus, a proxy provider has an interest in finding the fastest and most reliable exit nodes for the user that requests media streaming. If the exit node's speed is slow or unreliable, the user will experience jitters, stoppage, or a drop in media quality.

Proxy providers face a set of problems related to both scraping and streaming activities. For scraping, it is important to provide the user with the exit nodes that have a lower probability of being blocked. For streaming, it is important that the exit nodes provided to the user are reliable and fast. Otherwise, the media streaming experience will be hindered because of the quality of the proxies used.

Moreover, if the exit node disconnects during a session, thus interrupting the established path toward the content provider, the user has to reconnect to the streaming service. If upon reconnection the user is being assigned a different exit node, the website may demand to repeat authentication or to confirm human interaction. The repeated authentication also interrupts the quality of service.

To solve at least these problems, in one aspect, the present embodiments detailed herein store and employ an exit node (a proxy) performance and attribute history at a service provider's side. By analyzing an exit node's history, a service provider is able to both heuristically predict the performance and reliability of the exit nodes that are being assigned as well as ensure that the same exit nodes are reserved for a user over time, thus maximizing the efficiency of the exit node pool.

SUMMARY OF THE INVENTION

The present embodiments analyze the history of the exit nodes, organized in groups, or pools, and predicting their performance and behavior as a group.

In one instance, the history allows proxy service providers to assign an exclusive proxy pool to a user, where the pool is not shared with other users. In another instance, it allows to heuristically predict the performance and behavior of the exit nodes, or groups of exit nodes, so that new users are assigned the potentially best fitting exit nodes. The heuristic prediction also allows to predict a risk factor associated with connection reliability and to address these risks before they cross a certain threshold assigned to each user.

The success of web scraper operations highly depends on the scraping functionality presenting their activities as organic traffic to the website. The proxy service provider can help the scraping request appear organic and human-like by relaying said requests through exit nodes that exhibit attributes typical of organic users. This is enabled by collecting historical data of the exit node, such as its geographical location, IP type, and usage history with a target website. Using collected and aggregated historical data, a proxy provider is able to predict which exit nodes will be more successful at scraping a particular website at a given time or in the future.

Similarly, in at least one embodiment, historical data is used to predict which exit nodes will have the best speed and reliability required by streaming activities through a proxy server. Using the collected historical data about an exit node's average speed, average uptime, connection time and duration, average amount of traffic per day, variations in which median and percentile groups are used instead of average values, and other similar attributes the service provider is able to heuristically predict which exit nodes will provide the fastest and the most reliable connection for a streaming session.

Once the best fitting exit nodes are identified, the service provider ensures that these exit nodes are exclusive to the user that made the initial request. Otherwise, the best rated proxies would be assigned a disproportionately heavy load and their performance would decrease. Once an exit node disconnects from the current pool, another one is taken from the exclusive group. If no proxies are available in the exclusive group, a new one is found in the non-exclusive groups and assigned to exclusive. This ensures that a user is always working with the best quality exclusive exit nodes and the efficient utilization of the exit nodes is maximized.

In at least one embodiment, exit nodes report their utilization data to the proxy server management platform which aggregates the data and uses it to predict future transformations of the current pool. It predicts whether the pool will increase or decrease in quality over a period of time. This enables a proxy server provider to refill the exclusive group candidate queue before the current exit nodes disconnect, thus addressing connection reliability risks before they cause issues for the user.

DETAILED DESCRIPTION OF THE INVENTION

Figure 1:
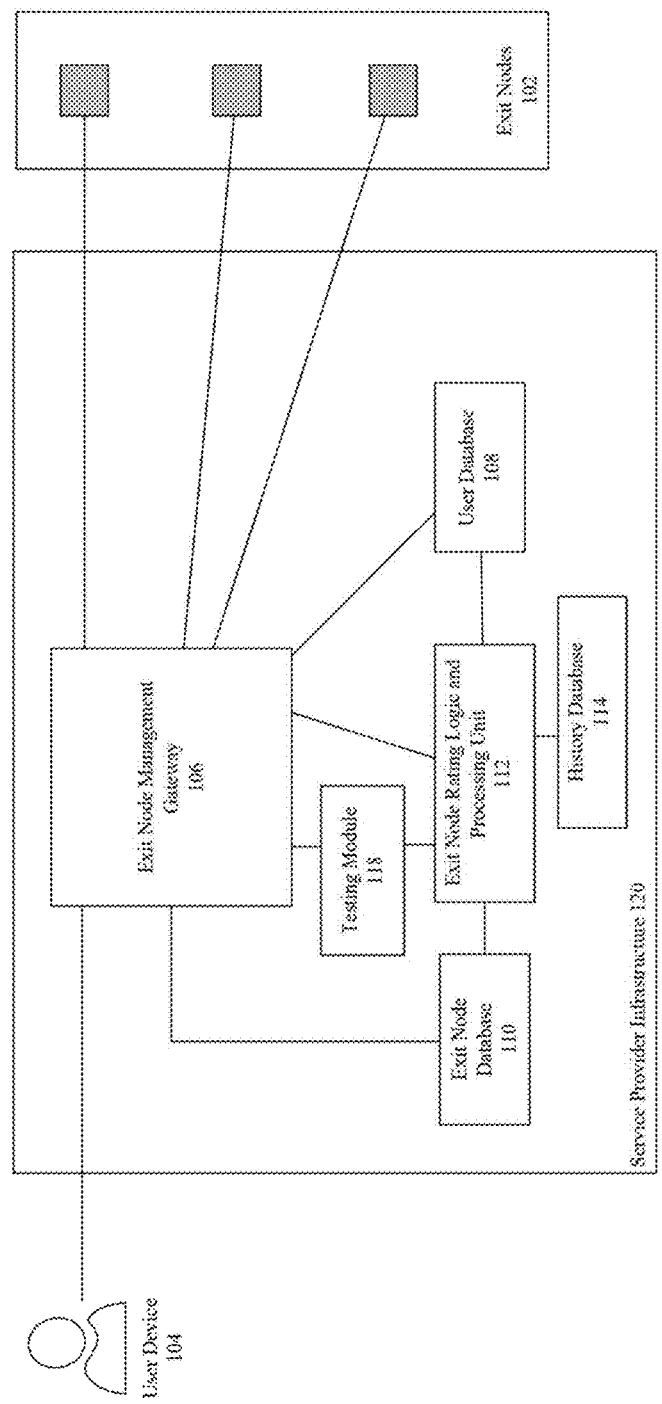
FIG. 1 shows a block diagram of an exemplary architectural depiction of components.

Some general terminology descriptions may be helpful and are included herein for convenience and are intended to be interpreted in the broadest possible interpretation.

Exit Node Management Gateway (also Gateway) 106—is a processing unit within the service provider infrastructure that communicates with both the User's Device that sends requests to it and with Exit Nodes that ultimately service these requests. Furthermore, it stores and consults results in the User Database about exit node pool formation. It can also trigger actions in the Exit Node Rating Logic And Processing Unit (shorter—Logic Unit).

User Database 108—is a memory storage that stores information about the User Device's service level and requests. Service level can be formulated through a Service Level Agreement (SLA) between the user and the service provider. Examples of SLA parameters include agreed service targets, criteria for target fulfilment evaluation, roles and responsibilities of Service Provider, duration, scope and renewal of the SLA contract, supporting processes, limitations, exclusions and deviations. In addition to the information regarding service level, User Database stores technical parameters about exit nodes or exit node pools that fulfill the SLA, for example service speed, reliability, response time, traffic load, schedule, compatibility with third party services (like a certain target website), and others. The translation of SLA parameters to technical parameters can be done in a variety of ways, including ad hoc human decision, machine interpretation, direct user interaction, and others. This does not change the overall functioning of the embodiments. In what follows, the concept of 'parameters' refers generally to the technical parameters of the exit nodes required to maintain the SLA.

Exit Node Database 110—is a memory storage that stores information about the Exit Nodes. Some exemplary parameters stored in this database include but are not limited to an exit node's geographical location, connection type, consent to participate in a distributed Content Delivery Network (CDN) access model, current speed, traffic per day, session runtime, battery life, and others. CDN is a geographically distributed group of servers which work together to deliver Internet content.

Exit Node Rating Logic And Processing Unit (Logic Unit) 112—is a processing unit within the service provider infrastructure that communicates with Exit Node Management Gateway that sends requests to it and with Exit Node Database, History Database, User Database, and Testing Module which contain information to be processed. Exit Node Rating Logic And Processing Unit is primarily responsible for analyzing (processing) information about exit nodes, pools, and user's request parameters and finding the best fit for them. Examples of processing operations include but are not limited to grouping data in categories, forming series of data (ordered, partially ordered or unordered), aggregating data, extracting aggregated results, performing statistical analysis, running machine learning and deep learning algorithms, forming predictive models, and other processing functions. In some embodiments, the Logic Unit contains two related mechanisms—Pool Health Rating Mechanism and Exit Node Quality Rating Mechanism. These two mechanisms can be physically contained in the same machine as the Logic Unit but they can also be placed in other devices in which the Logic Unit can interact with them.

History Database 114—is a memory storage that stores information extracted from the Exit Node Database and User Database by the Exit Node Rating Logic And Processing Unit about the Exit Nodes' and User's Device. It stores two types of information. The first type of information is service history that relates a particular user's device with particular exit nodes or pools of exit nodes and once the service ends for the user device, service history can be deleted, archived or accumulated but not used. The second type of information is aggregated history that includes but is not limited to aggregated data about Exit Nodes' overall performance over their entire history or a period of time. Some exemplary parameters stored in aggregated history are average speed, average response time (globally or to a particular service), average uptime, average schedule (connect and disconnect time signatures), changes in geographical location, changes in connection and IP type, changes in consent to participate in a distributed CDN access model, variations in which median and percentile groups are used instead of average values, and others.

Testing Module 118—is a processing unit that performs tests against exit nodes according to a number of parameters, including but not limited to geographical location, connection type, consent to participate in a distributed CDN access model, current speed, traffic per day, session runtime, and others.

Pool Health Rating Mechanism (PHRM)—is a mechanism contained in and used by the Logic Unit that calculates and predicts the pool health of a particular exit node pool. It also sets a minimal acceptable pool health threshold for the pool's health and if pool health falls below or is predicted to fall below the minimal acceptable pool health threshold, the Logic Unit informs the Gateway and the Gateway requests that new exit nodes be added to the pool.

Exit Node Quality Rating Mechanism (ENQRM)—is a mechanism contained in and used by the Exit Node Rating Logic And Processing Unit that calculates the fitness of a particular exit node for a particular pool based on the Improvement Score (IS) that results from the predicted pool health with and without an exit node.

Quality—is an aggregate criterion in the PHRM that encapsulates all the parameters defined by the user request parameters. It includes but is not limited to parameters such as minimal response time in general or for a specific target, speed (throughput), maximum latency (the delay before a transfer of data begins), schedule, reliability, pool impact, and other such parameters. They are all given a specific weight in the calculation of quality which is a criterion aggregated from the pre-set parameters.

Pool Health—is an aggregate criterion in the PHRM that encapsulates the change of pool's quality over time.

Minimal Threshold—is an aggregate criterion in the PHRM that encapsulates minimal actual or predicted pool health that would retain the same pool without changing pool's exit nodes. It is established based on the parameters established in the user device's request.

Improvement Score (IS)—is an aggregate criterion in the PHRM and the ENQRM that encapsulates the difference between predicted pool health with and without a particular exit node in the pool. It is used by the ENQRM to decide the fitness of an exit node to a particular pool.

Service History—relates a particular user's device with particular exit nodes or pools of exit nodes and once the service ends for the user device, service history can be deleted, archived or accumulated but not used.

Aggregated History—includes but is not limited to aggregated data about Exit Nodes' overall performance their entire history or a period of time. Some exemplary parameters stored in aggregated history are average speed, average response time (globally or to a particular service), average uptime, average schedule (connect and disconnect time signatures), changes in geographical location, changes in connection and IP type, changes in consent to participate in a distributed CDN access model, variations in which median and percentile groups are used instead of average values, and others.

Exit Node Pool—is a set of exit nodes that is being actively used for a user's request.

Exclusive Node—is an exit node that only serves a particular user or a user's request and is not shared with other users or requests by the same user while exclusivity is valid. The exclusivity parameter can be saved in the service history of the History Database.

Exclusive Pool—is a pool that contains only exclusive exit nodes. The exclusivity parameter is saved in the service history while in use and might be removed, archived or kept unused when a user stops using the service.

Static Parameter—is a parameter that has a fixed value over a period of time, such as exit node's geographical location, connection and IP type, consent to participate in a distributed CDN access model, and others.

Dynamic Parameter—is a parameter that constantly changes in time, such as current and average speed, traffic per day or overall, session runtime, battery life, variations in which median and percentile groups are used instead of average values, and others.

Batch—is a set of exit nodes that return a test response within a predefined portion of time, e.g. one second or similar.

Heuristic Prediction—is a prediction of the development of a set of parameters or a parameter that is based on the history of the change of these parameters and the current values. It informs decisions which themselves influence the development of the parameters.

Candidate Exit Nodes—is the set of exclusive or non-exclusive exit nodes that are available for use by the user's device but are not involved in the active rotation.

User Device 104—is any device or devices used by the user to communicate their requests to the Service Provider Infrastructure 120. User Device 104 can be a singular device, like a computer or a tablet, or it can be a network of devices connected together.

Exit Node Connection Kit—is a collection of software functions in one installable package deployed in the Exit Nodes 102 that manages connectivity with the Gateway 106 and as long as the Exit Node Connection Kit is engaged, the communication is possible. If the Exit Node Connection Kit is stopped, then an exit node is inactive and unable to interact with the Service Provider Infrastructure 120. Exit Node Connection Kit can be a standalone application, an integrated component of another application, a system service, a launched daemon, and others. Exit Node Connection Kit can be executed from any Computer Readable Medium 806.

In one aspect, one of the embodiments described herein provides systems and methods for effectively selecting and managing Exit Nodes 102 by making them exclusive for one User Device 104. Once a User Device 104 registers with Gateway 106, its information and requested parameters are stored in the User Database 108 and whatever pool is ascribed to execute its request, the pool can become exclusive to the User Device 104, thus making the Exit Nodes 102 contained in the pool unavailable to execute requests of other Users. The relation between the User's Device 104 and the exit node pool is recorded in the History Database 114 by the Logic Unit 112. This mechanism ensures that the same User Device 104 works with the same pool of exclusive exit nodes whenever they are available. This maximizes the efficiency of the Exit Nodes' 102 usage because new exit nodes are only required when an exclusive pool is exhausted. By using this mechanism the service provider is able to book the lowest sufficient number of exit nodes and fulfill the needs of its users.

In another aspect, one of the embodiments described herein provides systems and methods for effectively testing and ranking Exit Nodes 102 and heuristically predicting their future performance by aggregating their history and the current and future needs of the pools assigned to User's Device 104. All connected Exit Nodes 102 report to the Gateway 106 by responding to test requests sent by it. The Gateway 106 can collect the test responses in a batch that contains all the responses received in a defined period of time. The Gateway 106 reports the test results that contain information about Exit Nodes' 102 current performance to the Logic Unit 112 to produce aggregated data about the Exit Nodes 102 and store them in the History Database 114. The Logic Unit 112 then uses the History Database 114 to make heuristic predictions about the future performance of the currently active pools as well as the newly connected exit nodes.

The prediction is facilitated by mechanisms that evaluate both the general pool health and the quality of a particular exit node and its potential impact on the pool health. One such exemplary mechanism predicts that the pool health will fall below the minimal acceptable pool health threshold at a certain time and instructs the Logic Unit 112 to request new exit nodes for that pool. Logic Unit 112 then engages with another mechanism that determines which exit nodes would make the best fit for the pools currently requesting expansion based on the predicted improvement score that they would achieve. These mechanisms can be different platform components from Logic Unit 112 or a distinct functionality within Logic Unit 112. In what follows, the mechanisms are treated as functionalities of the Logic Unit 112 but they could be performed outside of it without changing the overall functioning of the embodiments.

In yet another aspect, at least one of the embodiments described herein provides systems and methods for effectively forming pools of Exit Nodes 102 based on their aggregated history and heuristically predicted performance as well as fitness for a User Device 104 request. User Device 104 requested parameters are evaluated against the aggregated history of Exit Nodes 102 and a heuristic prediction is made as to the future pool health, so the Logic Unit 112 can choose the optimally formed pool that will be predictably healthy and further predictions will be made to maintain the optimally curated pool. If the predicted exclusive pool is exhausted, a new exit node is also selected using heuristic prediction, so that the pool health is maintained above the minimal acceptable pool health threshold.

Heuristic prediction is generally performed within the server that contains Logic Unit 112, and, in some embodiments, may require a configuration file or multiple files, although the heuristic prediction can be performed on a different server, e.g., a 3rd party service or data processing platform. Heuristic prediction requires previous data which is aggregated over a period of time. Types of data that can be used in heuristic prediction include frequency, intervals, and schedule at which static parameters are changed (geo-location of exit nodes, their IP type, consent to participate in CDN proxying, and others), dynamic parameters (time seen, session duration and timestamps, timestamps of idleness, current total traffic, traffic per day or other period of time, response time, latency, target, battery life, and others), and aggregated dynamic parameters over any period of time (average speed, average session duration and timestamps, average traffic, average response time, average latency, most/least visited targets, error rate with a particular target, variations in which median and percentile groups are used instead of average values, and others) in any combination and with any weights associated with the parameters.

In at least one embodiment, Gateway 106, User Database 108, Exit Node Database 110, Logic Unit 112, History Database 114, and Testing Module 118 are parts of the Service Provider Infrastructure 120.

FIG. 1 shows an exemplary overall structure that comprises a User Device 104, which can be any computing device (e.g., a personal computer, mobile phone, a tablet computer) having access to a particular network (e.g. Internet connection), a Service Provider Infrastructure 120, containing Gateway 106, User Database 108, Exit Node Database 110, Logic Unit 112, History Database 114, and Testing Module 118, and Exit Nodes 102. While the elements shown in the FIG. 1 implement an exemplary embodiment, some elements in other embodiments can have different titles or can be combined into a single element instead of two separate elements (for example, Exit Node Database 110 can be combined with History Database 114 as a single infrastructure component). However, the functionality of elements and the flow of information between the elements is not impacted generally by such combinations or consolidations. Therefore, FIG. 1 as shown should be interpreted as exemplary only, and not restrictive or exclusionary of other features, including features discussed in other areas of this disclosure.

Within the Service Provider Infrastructure 120, Gateway 106 communicates with the outside elements, namely the User Device 104 and the Exit Nodes 102. While communicating with the User Device 104 it can accept requests with a set of parameters from it. These parameters correspond to attributes of the Exit Nodes 102. The Gateway 106 serves as the medium between User Device 104 and Exit Nodes 102 and the rest of Service Provider Infrastructure 120 serves to select, maintain, exchange, and otherwise manipulate pools of exit nodes and single exit nodes.

Upon receiving a request from a User Device 104, the parameters contained in the request Gateway 106 stores the parameters in User Database 108. User Database 108 is basically a storage that contains User Device 104 identity and the requested technical parameters. When a new request is made, a pool of exit nodes or an exit node is required to serve that request. To acquire the required pool or exit node, Gateway 106 makes a request to Logic Unit 112. Logic Unit 112 proceeds to form a pool. In at least one embodiment, Logic Unit 112 addresses Exit Node Database 110 to form an initial group that corresponds to a predefined set of static criteria. Exit Node Database 110 already contains basic information about an exit node, e.g. its geographical location, IP type, and consent to participate in a distributed CDN access model. If such parameters are stored in User Database 108, Logic Unit 112 will specify them in the request to Exit Node Database 110. This way only eligible exit nodes will be included in the initial group. A set of these initial static parameters defines the necessary criteria for an exit node to enter the pool.

In one embodiment, once Logic Unit 112 acquires an initial group of eligible exit nodes, it consults History Database 114, and in particular service history, to check if the exit nodes in the initial group are not exclusive to any other User Device 104. If they are, it removes them from consideration and requests new exit nodes from Exit Node Database 110. In some embodiments Exit Node Database 110 and History Database 114 might be consolidated into one mechanism, so Logic Unit 112 could request only eligible and non-exclusive exit nodes in one request. Once Logic Unit 112 forms a pool that is both eligible and non exclusive, it forwards the pool to Gateway 106 and records the pool as exclusive to User Device 104 in User Database 108. Gateway 106 can then begin to serve the pool to User Device 104. Serving a pool refers to the action by which Gateway 106 enables User Device 104 request to be executed by the Exit Nodes 102 individually or in a pool. If an exit node or a pool of exit nodes is being actively used to perform a user's requests (like content fetching from a target website, scraping, media streaming, and others), then that exit node or pool is being assigned to that user which places the request.

In one embodiment, when Logic Unit 112 forms the initial group, it tests the eligibility and non-exclusiveness of the exit nodes but does not need to perform any testing in Testing Module 118. Instead, it addresses History Database 114, and in particular aggregated history, to make a heuristic prediction about the pool through PHRM, so that pool's health is already calculated at the start of the service. When a pool is created based on the heuristic prediction, it is forwarded to Gateway 106 and recorded as exclusive to User Device 104 in User Database 108. Gateway 106 can then begin to serve the pool to User Device 104.

A pool that is being assigned has to be constantly monitored, measured and maintained, otherwise the quality of service might be compromised. It is one of the responsibilities of the service provider to maintain the quality of service. Thus, tests are being performed on the exit nodes. Generally, there are two types of tests available to the service provider—organic and synthetic. Organic tests are monitoring real user-server activities. Synthetic tests are imitating such activities. For example, synthetic tests could generate human-like scraping or streaming requests and run them against real targets, later measuring and analyzing the response. In what follows, organic and inorganic (synthetic) tests are not distinguished therebetween, since both types of tests can be equally performed without changing the overall functioning of the embodiments.

Some tests can consist of Exit Nodes 102 sending requests to a target (for example, to a testing service or a specific target website) and returning the results to Gateway 106. The results are then processed by Logic Unit 112 and stored in History Database 114, more specifically aggregated history. The results can be kept for an indeterminate period of time or used just for a particular prediction. Tests can also be executed by the service provider. In that case Logic Unit 112 makes a request to Testing Module 118 to perform a test to determine a particular quality of an exit node. Testing Module 118 performs the testing through Gateway 106. The results of tests are returned to the Logic Unit 112 to be aggregated and then recorded in History Database 114, aggregated history.

In one embodiment, one of the functions of Logic Unit 112 is to predict the pool health of every pool through PHRM. If Logic Unit 112 determines that the pool health will traverse the minimal acceptable pool health threshold in the pre-defined period of time in the future, it replaces some of the pool's exit nodes in advance, so that the Pool health threshold is not trespassed.

Logic Unit 112 uses another mechanism—ENQRM—to determine which pool an exit node would improve the most. It relies on the improvement score to do so, where the Improvement score indicates the assessed measurable difference in quality between two options—the predicted pool health with the said exit node included in the pool and with the pool left unmodified. The pool that would have the biggest improvement from the exit node being added receives the new exit node. If an exit node does not improve any pool, it can be reserved for later use and left idle/vacant. If all pools are sufficiently populated, exit nodes can be reserved or assigned to pools non-exclusively.

There can be multiple types of events or conditions that can trigger replacing exit nodes within a pool. They include but are not limited to an exit node disconnecting, pool's health dropping or being predicted to drop, a change in the overall quality of the exit nodes, a request parameter change requested by the user, an overload of the infrastructure, an increase in either the number or volume of user request or exit nodes, or any combination of these events.

There can be different mereological configurations of exit nodes and pools. Mereology defines parthood relationships. The current embodiments do not rely on a specific mereological system or ontology. Pools can be ordered, unordered, or partially ordered sets or aggregates of exit nodes. The relationship between exit nodes and pools can be defined as reflexive or non-reflexive, transitive or non-transitive, symmetric, asymmetric, or antisymmetric, or any non-contradictory combination of these qualities. Pool to pool relations can be defined under any set-axiomatic principles. None of these conceptions change the overall functioning of the embodiments.

Figure 2:
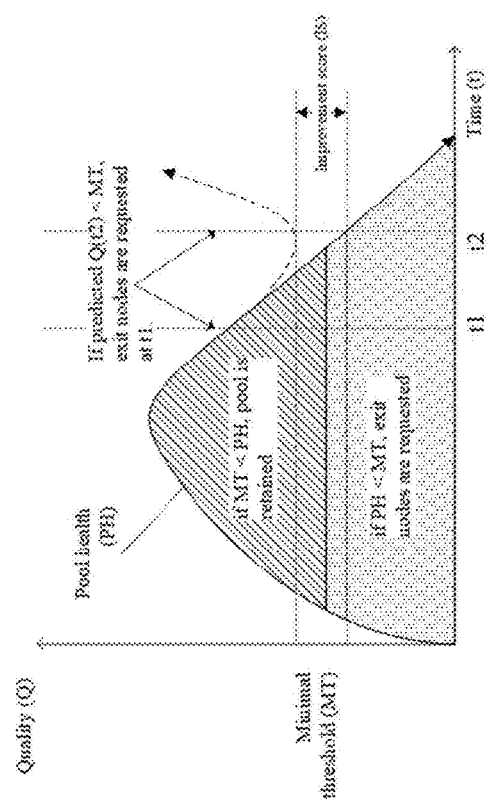
FIG. 2 shows a functional diagram of the pool health rating mechanism.

FIG. 2 shows a functional diagram of the PHRM that is contained in Logic Unit 112. FIG. 2 represents the general mechanism dedicated to monitoring and predicting pool health. Pool health is the pool's quality over time. Quality can be calculated by assigning different values and weights to the parameters formulated by User's Device 104 and registered in User Database 108. Each pool's quality can be calculated differently based on the parameters requested by the user (service speed, reliability, response time, traffic load, schedule, compatibility with third party services, and others). Minimal acceptable pool health threshold can be established by the service provider's decisions based on the user's requirements.

The minimal acceptable pool health threshold can be fixed or it can change depending on the resources available. Minimal acceptable pool health threshold represents the minimal quality that is acceptable for a pool to support the quality of service expected. PHRM calculates and heuristically predicts the values of pool health over time. Heuristic predictions can be based on the aggregated history and/or service history contained in History Database 114 or any other database. Attributes, relevant for prediction in the service history can include: total pools per period, total users (since a user through a device can operate multiple pools, this differs from "total pools" attribute), total idle connection time, total pool time, average pool time, average pool change rate, average pool health, and other similar attributes or any combination thereof.

There can be various mathematical and statistical models used for heuristic prediction and optimization. Most models will provide a result within some confidence range but confidence ranges are not necessary. There can be additional steps added to the mechanism due to mathematical models used in optimization (for example, relaxation and approximation methods) but this fact does not change the overall structure of the mechanism or the current embodiments more generally.

Both PHRM and ENQRM can include machine learning algorithms. Machine learning can be broadly defined as computational methods using aggregated data to improve performance or to make accurate predictions. Here, aggregated data refers to the past information available to the machine learning algorithm, which typically takes the form of electronic data collected and made available for analysis. The data made available to PHRM and ENQRM is the aggregated exit node history contained in the History Database 114. Both PHRM and ENQRM can be any heuristic that can be trained using available data to predict future results. Computational or machine learning models may be used here for heuristic prediction (or for a part thereof).

Both PHRM and ENQRM may comprise computational models such as neural networks, classification or regression trees, support vector machines, logistic regressors, Gaussian process models, or other computational models. They essentially decide the suitable coefficients, loads, groupings, associations, boundaries, hyperparameters or other model traits that are utilized by the general heuristic prediction to make forecasts, by feeding as inputs into the heuristic prediction aggregated historical and service data, contained in the History Database 114.

Some computational or machine learning models are supervised, meaning they are trained for each case on defined training examples with a known output. Other models of computational or machine learning use unsupervised learning, meaning that they are trained by unlabeled examples that have no defined outputs for each example.

For example, if PHRM and ENQRM are an artificial neural network model (supervised or unsupervised), various coefficients that are used by the neural network have to be learned. The neural network may learn these coefficients using the input training data and comparing the output result to known actual results (i.e., whether/when pools and exit nodes being ranked performed as predicted by PHRM and ENQRM).

The accuracy of the predictions will depend upon the computational complexity of PHRM and ENQRM (how many independent variables/neurons/neuron-layers/etc. are considered), the breadth of historical data in the History Database 114 used to train the heuristic prediction, and the available data about each exit node. Moreover, since the aggregated history is periodically updated, it is not static and may receive new data or updates to previously received data. Thus, PHRM and ENQRM may be configured to periodically re-train as data is updated.

If PHRM determines that pool health is below the minimal acceptable pool health threshold, Logic Unit 112 informs Gateway 106 and it requests new exit nodes to be added to the pool. If pool health is above the minimal acceptable pool health threshold, a pool can be maintained as it is. If, at a given moment, PHRM predicts that pool health will fall below the minimal acceptable pool health threshold in future (say, t2) within a pre-defined period of time e.g. next 30 minutes, then Logic Unit 112 requests new exit nodes in advance (say, at t1), so that the threshold would not be breached. The precise time signatures will depend on the mathematical models used which do not specifically impact the overall functioning of the mechanism. The difference between the a) predicted quality of the pool without change and b) with the addition of a new exit node or exit nodes, is the improvement score of that exit node.

Figure 3:
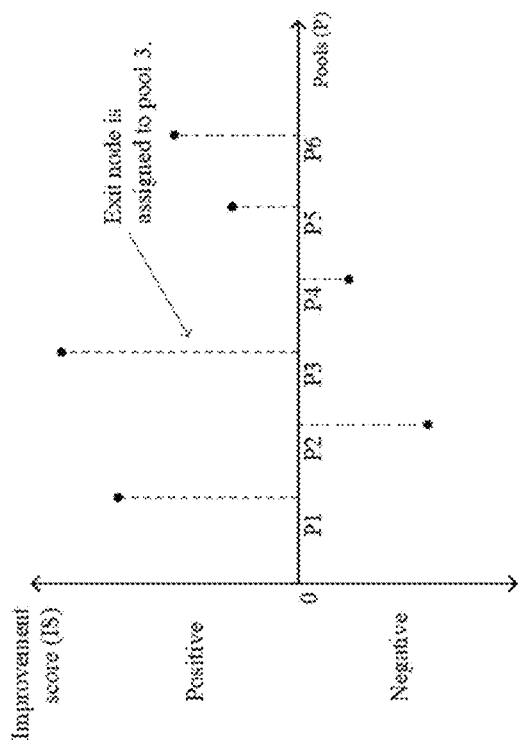
FIG. 3 shows a functional diagram of the exit node quality rating mechanism.

FIG. 3 represents a functional diagram of ENQRM. When PHRM determines that the pool health has violated the minimal acceptable pool health threshold or is predicted to do so within a pre-defined period of time, Logic Unit 112 informs Gateway 106 and Gateway 106 requests forming a new pool of exit nodes for the request. The new pool can have overlapping exit nodes with the previous ones. In other words, only some of the exit nodes in the pool can be chosen to be replaced. Otherwise, a full pool can be replaced at once.

Logic Unit 112 directly obtains candidate exit nodes from Exit Node Database 110 which have to be evaluated by the ENQRM in Logic Unit 112. The selection of candidate exit nodes can be gathered based on the attributes of the exit nodes, some kind of order among them (for example, the order in which they register with Gateway 106), they can be grouped into batches based on a time interval in which they perform tests, or any such criteria. ENQRM evaluates the suitability of each exit node to a particular pool according to user requests parameters and the attributes of the exit node. That calculation is based on the improvement score of each exit node and the corresponding pool. ENQRM can consider pools for optimization changes that are currently considered for new exit nodes (i.e. they are below the minimal acceptable pool health threshold or are expected to fall below it) or it can choose to evaluate all exit nodes for general improvements of all or any or some pools.

For example, given an exit node and six pools, ENQRM calculates the improvement score of the exit node in each pool and determines the highest improvement score the exit node can deliver. The differences among improvement scores are the result of the current or predicted pool health and an exit node's current or predicted performance. In one embodiment, if only a single exit node is evaluated, it is immediately assigned to the pool with the highest assessed improvement score. If there are multiple exit nodes evaluated as a batch, the distribution decision is made after all exit nodes are evaluated. The exit nodes are assigned to the pools in which they have the highest improvement score. If the same exit node has the highest score in more than one pool, it can be assigned to the pool in which it has a higher improvement score.

It is unlikely that improvement scores will be equal for any exit nodes or pools because of the complex initial conditions and multiple factors taken into account while calculating the improvement scores. However, an additional step can be devised that enacts priority rules based on the weight of parameters (say, predicted speed over predicted session length), the priority based on pool size, or other such criteria. The ENQRM can also be instructed to wait for the next round of tests if the results are undetermined. However, such additional steps do not change the overall functioning of the ENQRM or any of the embodiments. If an exit node has negative values calculated as its improvement score with all pools, it can be left unassigned to any pool. Negative values of improvement score means that an exit node would decrease pool health instead of increasing it.

Figure 4A:
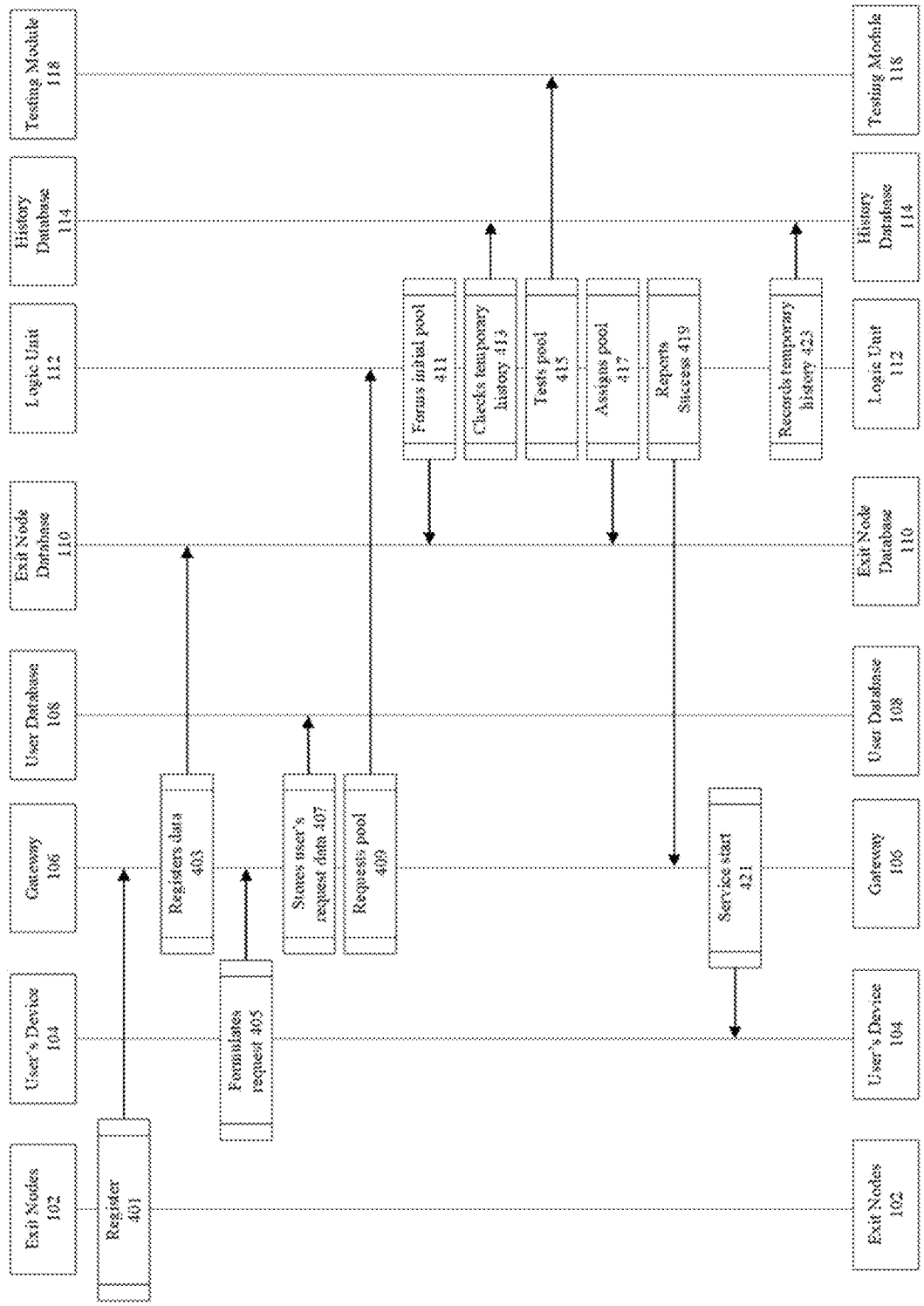
FIG. 4A shows an exemplary flow diagram of exit node rotation without heuristic prediction.

FIG. 4A represents an exemplary flow diagram of exit node rotation without heuristic prediction. In step 401, Exit Nodes 102 register with Gateway 106. Step 401 might involve additional steps initiated by the owner of the Exit Node's 102, like providing identification, reviewing and accepting terms of service, and similar actions. In step 403, Gateway 106 registers exit node's initial static data. Static data includes but is not limited to the acceptance of the terms of services, device type and model, operating system type and version, identification (e.g. an e-mail address), and consent to participate in a distributed CDN access model. There can be different levels of consent that specify the type of activities that an exit node's owner agrees to relay through their device. In step 405, User's Device 104 makes a request. A request can depend on the service type. It can be optimized for a certain activity, like scraping or streaming. A user can be given tools to manually define their request and assign parameters to it.

In step 407, Gateway 106 registers the user's requested parameters to User Database 108. There can be multiple sets of parameters per user if a single user registers multiple requests. The parameters can be pre-set by the service provider or they can be manually determined by the user. Generally, the parameters are first set in an SLA between the service provider and the user in the form of business requirements, for example, agreed service targets, criteria for target fulfilment evaluation, roles and responsibilities of the service provider, duration, scope and renewal of the SLA contract, supporting processes, limitations, exclusions and deviations, and similar clauses.

However, SLA information is translated into measurable technical parameters usable within Service Provider Infrastructure 120, for example, service speed, reliability, response time, traffic load, schedule, compatibility with third party services (like a certain target website), and others. Request parameters are registered and stored in User Database 108. In some embodiments, this translation from SLA to technical parameters can be omitted if the user specifies the parameters directly. Steps of registering the information and making a request (steps 401-407) can happen one after another or at the same time. Steps 405 and 407 can happen before 401 and 403. This order does not change the overall functioning of the embodiments.

In step 409, Gateway 106 requests a pool, specified by parameters recorded in User Database 108 in step 407. Gateway 106 can formulate its request for a pool in such a way that the parameters required by the user are reflected in that request. Logic Unit 112 receives the request to form a pool. In step 411, Logic Unit 112 retrieves an initial group from Exit Node Database 110. The initial group is formed according to the static parameters that define eligibility criteria for the exit nodes to enter the pool. For example, if in step 405 the user has specified that they want to access a target from an exit node in Australia, in step 407 Gateway 106 would specify that only exit nodes with the geo-location in Australia are eligible, and in step 411 Logic Unit 112 only requests exit nodes with the last known geo-location in Australia. In other words, Logic Unit 112 requests only eligible exit nodes to form an initial group.

In step 413, Logic Unit 112 checks whether any of the exit nodes in the initial group are exclusive to existing pools. The exclusiveness relations between user requests and particular exit nodes or pools of exit nodes are stored in the service history of History Database 114. If any of exit nodes in an initial group are exclusive, these exit nodes are replaced with other eligible exit nodes. In some embodiments, Exit Node Database 110 and History Database 114 might be consolidated into a single element. In that case steps 411 and 413 could become a single step defining the eligibility criteria to include that an exit node must be non exclusive to enter the initial group. However, that does not change the overall functioning of any of the embodiments. Once the initial group is formed and Logic Unit 112 confirms that all of the exit nodes in the pool are non-exclusive, Logic Unit 112 requests Testing Module 118 to perform tests on the exit nodes in the initial group in step 415. Testing Module 118 can perform the test through the Gateway 106.

Step 415 represents a way for the service provider to know the dynamic parameters of the exit nodes at a given time. The tests performed on the initial group can be initiated by the service provider or constantly performed and reported to the service provider by the exit nodes. In the latter case, the service provider would have to wait until all exit nodes in the pool return their test results. Exemplary dynamic parameters tested by Testing Module 118 in step 415 include but are not limited to time seen, session duration and timestamps, total traffic, traffic per day or other period of time, response time, latency, target, battery life, and others. If the test results satisfy the parameters specified in the user request, the pool or a single exit node (depending on the request) can be assigned to execute the request. If any of the exit nodes fail to satisfy the criteria or the overall quality (aggregated score of the performance of the pool) does not satisfy the request, steps 411, 413, and 415 can be repeated. The service provider can choose whether to begin serving the request with a subpar quality pool before, or while improving it, or wait until a pool is formed. This is a policy decision that does not change the overall functioning of any of the embodiments.

In step 417, when a pool is formed, Logic Unit 112 assigns the pool to the User's request. In step 419, Logic Unit 112 reports a successful assignment of the pool to Gateway 106. In step 421, Gateway 106 begins to execute User's Device 104 requests through the selected pool. As mentioned above, a service provider can choose to begin service even before a pool or exit node is found and improve the pool's health during the service. In step 423, Logic Unit 112 can choose to make the exit nodes in that pool exclusive to that user or user's request. If this is done, then the exit nodes in this pool will not be used for another user or a request by the same user.

Figure 4B:
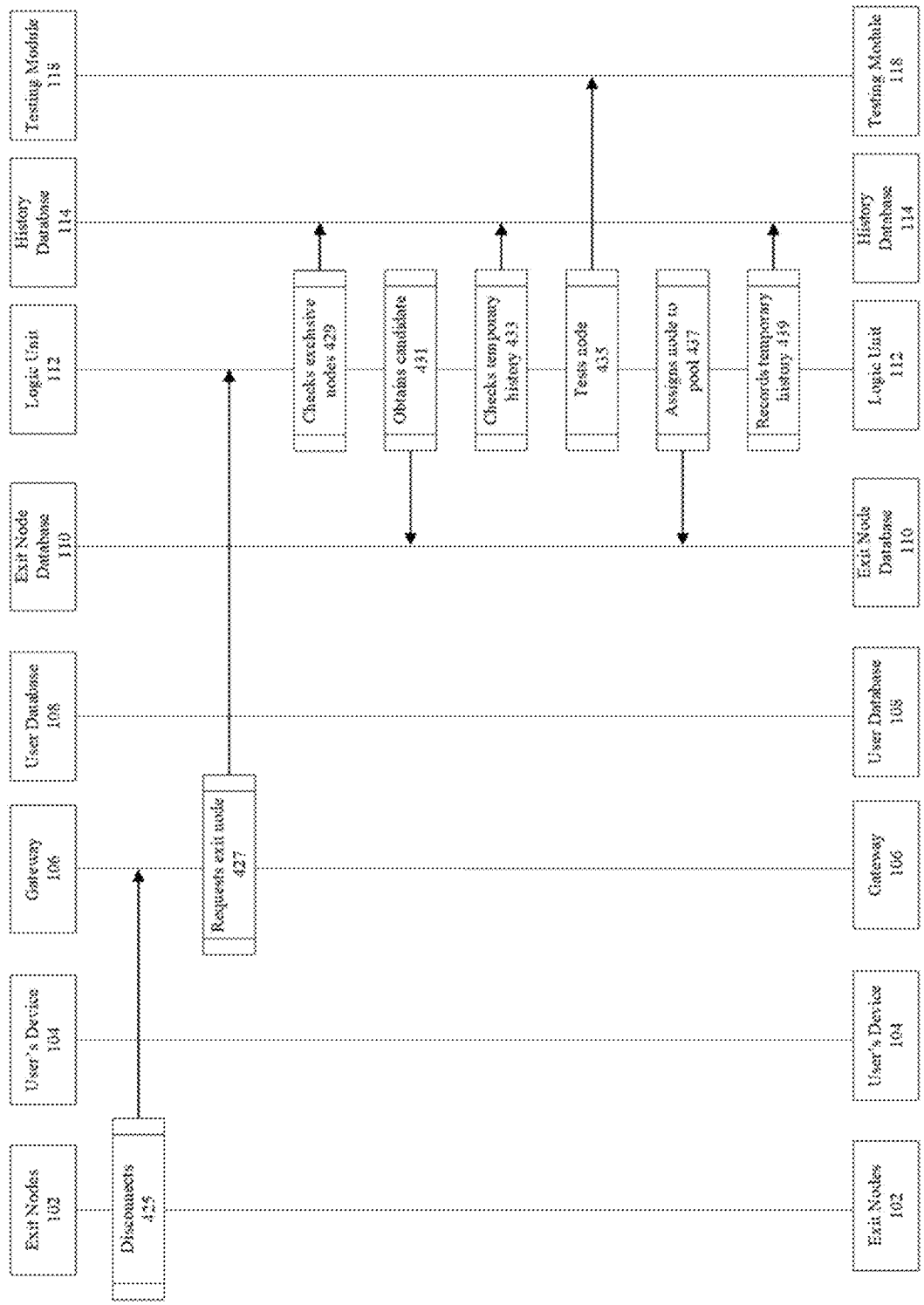
FIG. 4B shows the continuation of the exemplary flow diagram of exit node rotation without heuristic prediction.

FIG. 4B represents the continuation of the exemplary flow diagram of exit node rotation without heuristic prediction. It continues with step 425 in which a trigger is executed for Gateway 106 to find new exit nodes for populating the active pool. In one embodiment, the trigger can be one of the exit nodes in the pool disconnecting thus lowering the pool health. This case is represented by step 425 in which one or more of the Exit Nodes 102 disconnect. However, the trigger can be defined more broadly, including, but not limited, cases of a drop in exit nodes' speed, growing latency, change in geolocation or IP type, and similar events. The trigger can originate from within Service Provider Infrastructure 120 or outside of it. The type of trigger does not change the overall functioning of any of the embodiments.

Once the trigger is activated, in step 427, Gateway 106 makes a request to Logic Unit 112 for a new exit node or multiple exit nodes. Step 429 represents the first way that Logic Unit 112 would look for exit nodes, i.e. it checks History Database 114, and more specifically service history for exclusive exit nodes, i.e. nodes that are exclusive to the user or a particular request. These exit nodes have the explicit advantage over others because they have been tested for that particular request before and thus are already fit for executing the request. If Logic Unit 112 finds available exclusive nodes, it immediately returns them to Gateway 106 to be served. Such a rotation of the same exit nodes for the same user allows the service provider to effectively manage the usage of the exit nodes.

However, if in step 429 Logic Unit 112 does not find exclusive exit nodes, it must acquire new exit nodes. In step 431, Gateway 106 requests candidates to add to the current pool according to parameters recorded in User Database 108 in step 407. Gateway 106 can formulate its request for candidate exit nodes in such a way that the parameters required by the user are reflected in that request. Logic Unit 112 can request only eligible candidate exit nodes.

In step 433, Logic Unit 112 checks whether any of the candidate exit nodes are exclusive to existing pools. The exclusiveness relations between user requests and particular exit nodes or pools of exit nodes may be stored in the service history of History Database 114 or any other available database. If any of the candidate exit nodes are exclusive, these exit nodes are replaced with other eligible exit nodes. In some embodiments, Exit Node Database 110 and History Database 114 might be consolidated into a single element. In that case steps 431 and 433 could become a single step defining the eligibility criteria to include that an exit node must be non-exclusive to enter the initial group. However, that does not change the overall functioning of any of the embodiments. Once Logic Unit 112 confirms that all of the candidate exit nodes are non-exclusive, Logic Unit 112 requests Testing Module 118 to perform tests on the candidate exit nodes through the Gateway 106 in step 435.

Step 435 represents a way for the service provider to know the dynamic parameters of candidate exit nodes at a given time. The tests can be initiated by the service provider or constantly performed and reported to the service provider by the exit nodes. In the latter case, the service provider would have to wait until all exit nodes in the pool return their organic test results. Exemplary dynamic parameters tested by Testing Module 118 in step 435 include but are not limited to time seen, session duration and timestamps, total traffic, traffic per day or other period of time, response time, latency, target, and others. If the test results satisfy the parameters specified in the user request, candidate exit node(s) can be added to the current pool as presented in step 437. In step 439, Logic Unit 112 can choose to assign the updated pool as exclusive, thus making the newly added exit node exclusive to the user or user's request. If Logic Unit 112 assigns the new pool as exclusive and the disconnected exit node in step 425 was also exclusive, then the overall exclusive pool of the user or user's request is enlarged.

In one of the embodiments, the Logic Unit 112 can also decide to make the failed or disconnected exit node no longer exclusive to that pool. If Logic Unit 112 decides to assign the updated pool to exclusive, it may store that data in the service history of History Database 114 or any other database.

If any of the exit nodes in the pool disconnect again or any other condition triggers Gateway 106 to request new exit nodes, the same procedure starting with step 425 and potentially ending with step 439 commences. However, every time when in step 439 Gateway 106 assigns the updated pool to exclusive, the overall number of exclusive exit nodes increases, so the likelihood that an available exclusive exit will be found increases.

In at least one of the embodiments, if the user ends service agreement or otherwise ceases to use the service, the service history in History Database 114 can be deleted, archived or accumulated but not used and all the exit nodes are released from their exclusive bond with a user or a user's request. However, even if particular service data can be deleted, archived or disused, aggregated data can be extracted from the service data and stored within the aggregated history of History Database 114. Examples of such data include the time period for which the exit node has been exclusive, the total number of exclusive requests it has executed, and similar data.

Figure 5:
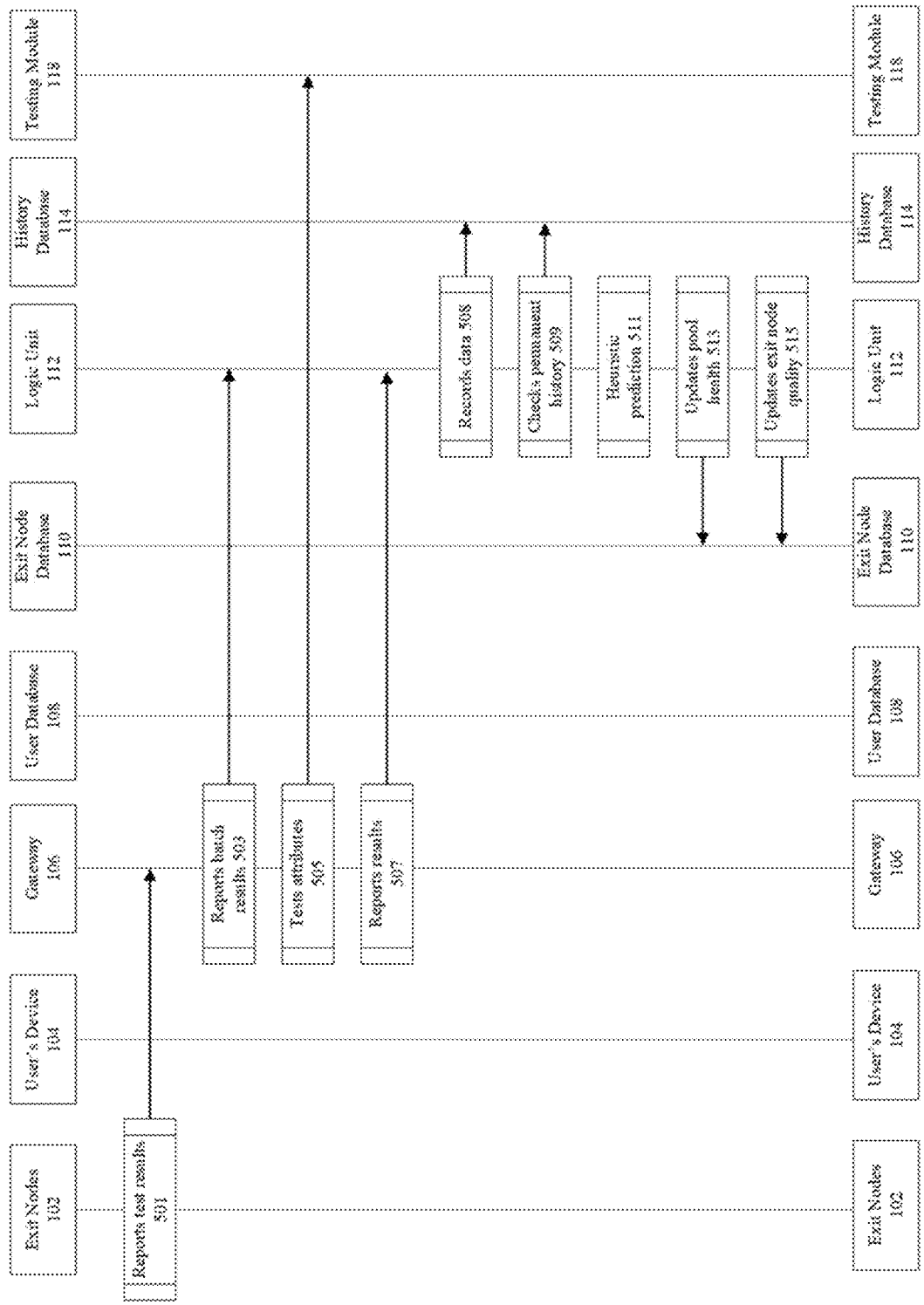
FIG. 5 shows an exemplary flow diagram of exit node rating with heuristic prediction.

FIG. 5 represents yet another embodiment of the exemplary flow diagram of exit node rating with heuristic rating prediction. In some embodiments, the heuristic rating procedure can be triggered by certain factors or a number of factors, like a drop in speed, exit node disconnection and similar events. However, in this embodiment, rating procedure does not need to be triggered. It is an ongoing process that supervises the quality of the exit nodes and the pool health of exit node pools. Instead of being triggered, it can itself trigger procedures for pool maintenance.

In step 501, Gateway 106 tests Exit Nodes' network connectivity by testing the Exit Nodes 102 and reporting the results. This testing is an ongoing scheduled activity. Testing means that Gateway 106 is sending exit nodes small packets of data and is receiving responses that are being measured. Additionally, Gateway 106 monitors and measures the organic activity of the exit nodes when they execute requests. Lastly, Gateway 106 can initiate testing in which it makes requests through the exit nodes to a target. The target can be a specific target website, a speed testing service server or similar destinations. Measured information in the responses contains data about the round-trip time for messages between the exit node and the destination (be it Gateway 106 or a target). Tests are generally executed once in a pre-set period of time, for example a minute for every exit node. In step 503, in some embodiments, Gateway 106 can decide to immediately forward individual results to Logic Unit 112 to process. However, in one embodiment, Gateway 106 can wait a pre-set period of time to collect the results and return them in a batch, thus saving processing time and cutting down repeated procedures. The collection time period can be pre-set, for example once a second, or it can be triggered once a certain number of test responses is collected, or both of these conditions can be applied.

Gateway 106 can also request for additional tests to be done on the exit nodes by Testing Module 118. Testing Module 118 can additionally learn about an exit nodes' current performance by testing dynamic parameters, time seen, session duration and timestamps, total traffic, traffic per day or other period of time, response time, latency, targets, battery life, and others. Testing Module 118 can perform the tests through the Gateway 106.

In some embodiments, Exit Nodes 102 can already be instructed to include that information in the initial test reports in step 501. In the latter case, tests by Testing Module 118 would not be needed and step 505 would be omitted but testing would need to be done internally in the Exit Nodes 102. In either case, in step 507, Gateway 106 reports the results to the Logic Unit 112.

In step 508, Logic Unit 112 gathers the aggregated data from the tests, monitoring organic requests and analysis of the tests results and stores it in the aggregated history of History Database 114. The aggregation of data can be done in different data models, including but not limited to an entity-relationship model, relational model, record-based logical model, hierarchical model, object-oriented model, object-relational model, flat model, semi-structured model, associative model, context model, and others.

In step 511, Logic Unit 112 engages in the two predictive mechanisms—PHRM and ENQRM described above and visualized in FIG. 2 and FIG. 3, respectively. Generally, Logic Unit 112 (by engaging with PHRM and ENQRM) relies on the aggregated data in History Database 114 to heuristically predict the future behavior, or status, of exit nodes in the pool and determine the pool health. It can also determine and predict the quality of particular exit nodes that could become candidates to pools that need exit nodes to be replaced. Pool health and exit node quality are attributes that are used to determine if exit nodes need to be replaced and which exit node should go to which pool. These attributes and predictions are stored in Exit Node Database 110 by Logic Unit 112 until a decision is made. In step 513, pool health information is stored by Logic Unit 112 in Exit Node Database 110. In step 515, exit node quality information is stored by Logic Unit 112 in Exit Node Database 110.

The process described in FIG. 5 is an ongoing process in Service Provider Infrastructure 120. It does not need to begin or end in specific conditions and in some embodiments it is constantly performed. It is an evaluation mechanism that monitors and supervises the workflow of the service. However, by itself it does not make any changes to the service. In other words, it is descriptive i.e. it describes the performance of the exit nodes and pools and predicts their future behavior. It then makes conclusions about pool health and exit node quality but it does not enforce any decisions about how the service has to be run. It provides the basis or foundation for making decisions but does not make those decisions by itself. It informs the decisions of other elements in the Service Provider Infrastructure 120, in particular Logic Unit 112 and Gateway 106.

Figure 6A:
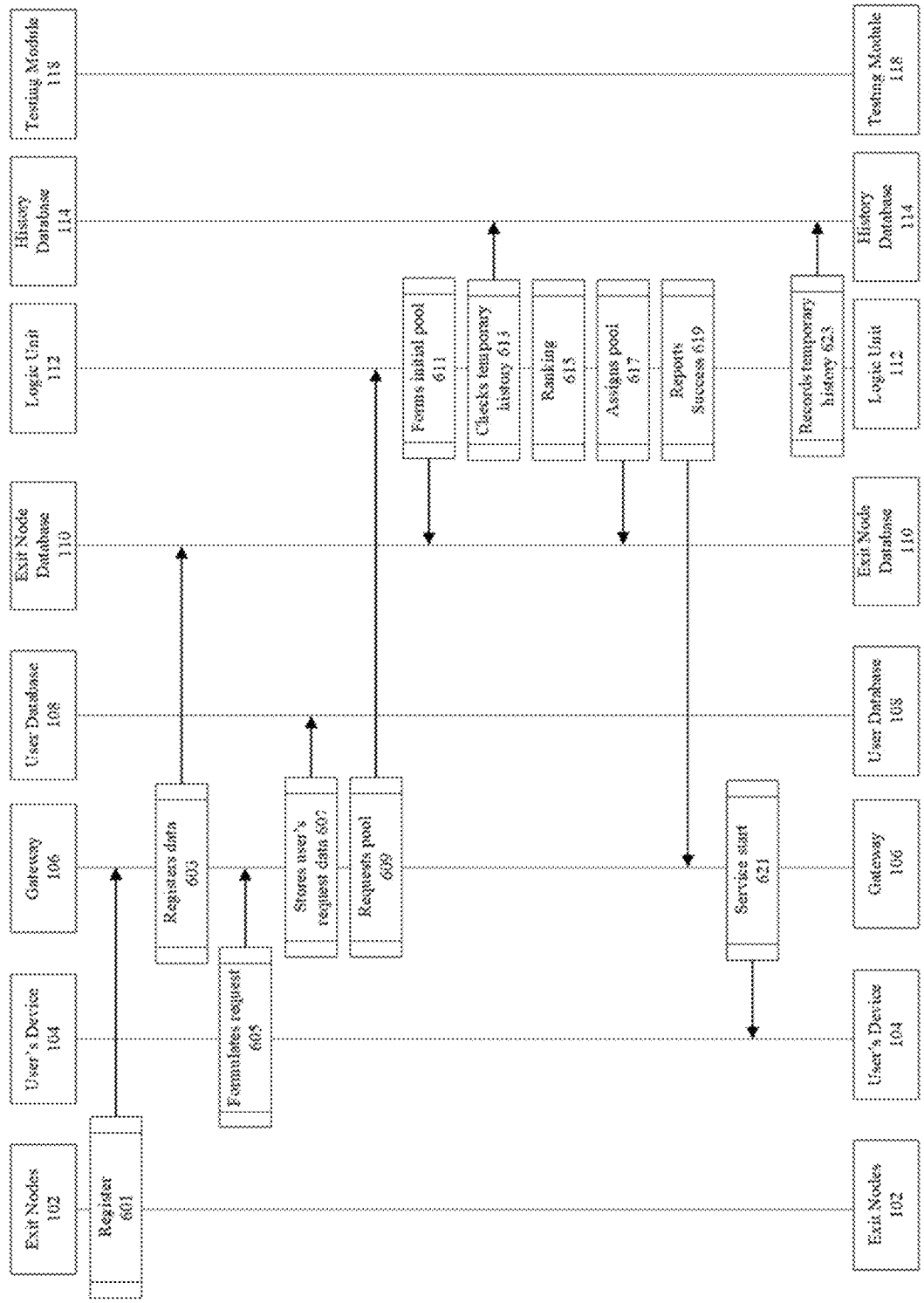
FIG. 6A shows an exemplary flow diagram of exit node rotation with heuristic prediction.
Figure 6B:
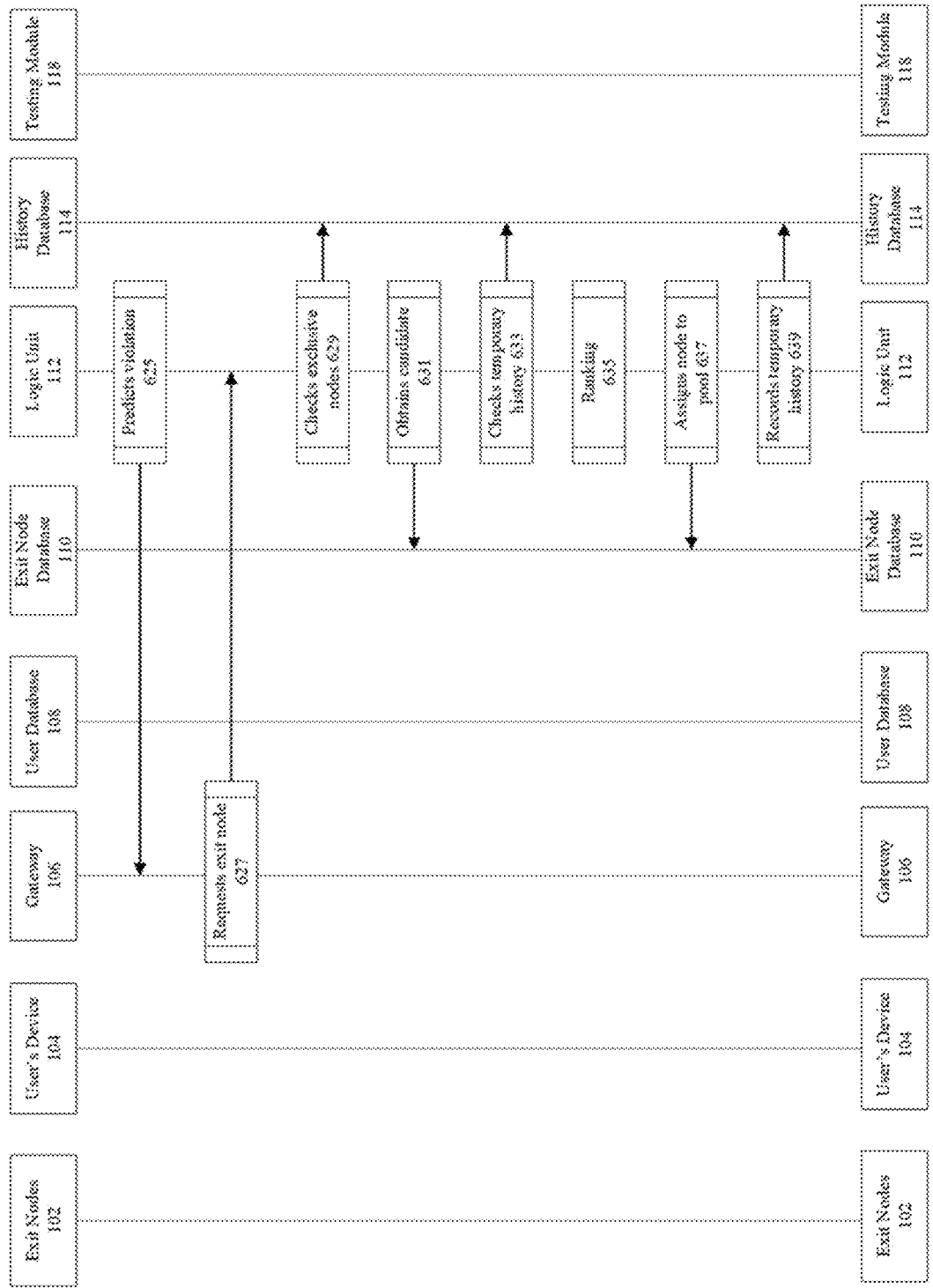
FIG. 6B shows the continuation of the exemplary flow diagram of exit node rotation with heuristic prediction.

An exemplary process in which such descriptions would be used to make decisions about pools and exit nodes is contained in FIG. 6A and FIG. 6B. FIG. 6A represents an exemplary flow diagram of exit node rotation with heuristic prediction. In step 601, Exit Nodes 102 registers with Gateway 106. Step 601 can optionally involve additional steps on the Exit Nodes 102 owner's side, like providing identification, reviewing and accepting terms of service, and similar actions.

In step 603, Gateway 106 registers exit node's initial static data. This includes but is not limited to the acceptance of the terms of services, device type and model, operating system type and version, identification (like an e-mail address), and consent to participate in a distributed CDN access model. There can be different levels of consent that specify the type of activities that an exit node's owner agrees to relay through their device. In step 605, User's Device 104 makes a request. A request can depend on the service type. It can be optimized for a certain activity, like scraping or streaming. A user can be given tools to manually define their request and assign parameters to it.

In step 607, Gateway 106 registers the user's requested parameters to User Database 108. The parameters can be pre-set by the service provider or they can be manually determined by the user. Generally, the parameters are first set in an SLA between the service provider and the user in the form of business requirements, for example, agreed service targets, criteria for target fulfilment evaluation, roles and responsibilities of the service provider, duration, scope and renewal of the SLA contract, supporting processes, limitations, exclusions and deviations, and similar clauses. However, SLA information is translated into measurable technical parameters usable within Service Provider Infrastructure 120, for example, service speed, reliability, response time, traffic load, schedule, compatibility with third party services (like a certain target web site), and others. Request parameters are registered and stored in User Database 108. In some embodiments, this translation from SLA to technical parameters can be omitted if the user specifies the parameters directly. Steps 601, 603, 605, 607 can happen one after another or at the same time. Steps 605 and 607 can happen before or after 601 and 603. The reordering of these steps does not change the overall functioning of the embodiments.

In step 609, Gateway 106 requests a pool to execute the user's request, specified by parameters recorded in 109 in step 607. Gateway 106 can formulate its request for a pool in such a way that the parameters required by the user are reflected in that request. Logic Unit 112 receives the request to form a pool. In step 611, Logic Unit 112 retrieves an initial group from Exit Node Database 110. The initial group is characterized by the static parameters that define eligibility criteria for the exit nodes to enter the pool. For example, if in step 605 the user's device has specified that it wants to access a target from an exit node in Australia, in step 607 Gateway 106 would specify that only exit nodes with the geo-location in Australia are eligible, and in step 611 Logic Unit 112 only requests exit nodes with the last known geo-location in Australia.

In other words, Logic Unit 112 requests only eligible exit nodes to form an initial group. In step 613, Logic Unit 112 checks whether any of the exit nodes in an initial group are exclusive to existing pools. The exclusiveness relations between user requests and pools are stored in the service history of History Database 114. If any of exit nodes in an initial group are exclusive, these exit nodes are replaced with other eligible exit nodes. In some embodiments, Exit Node Database 110 and History Database 114 might be consolidated into a single element. In that case steps 611 and 613 could become a single step defining the eligibility criteria to include that an exit node must be non exclusive to enter the initial group. However, that does not change the overall functioning of any of the embodiments.

In step 615 the current embodiment differs from the one represented in FIGS. 4A and 4B. Instead of testing the pool for dynamic parameters, as represented in step 415, this embodiment performs predictive ranking of the exit nodes to form the pool for the user's request. More specifically, Logic Unit 112 engages in the two mechanisms—PHRM and ENQRM—to determine which exit nodes forming a pool would satisfy the minimal acceptable pool health threshold pre-set by the user's request or the internal decision by the service provider. Given that PHRM and ENQRM are heuristic predictive mechanisms, it allows Logic Unit 112 to not only form an optimal pool at the moment but also predict its future behavior.

Step 615 can contain a flow of actions that is detailed in FIG. 5 (steps 501-515) which consists of gathering data, aggregating data, recording data in the History Database 114, performing heuristic prediction based on the aggregated data, and recording the prediction results.

For example, when Logic Unit 112 forms the initial group, it predicts the future behavior of its exit nodes, including their activity timestamps. Thus, even if a particular exit node, according to the aggregated data, satisfies the parameters pre-set by the user's request but it approaches its usual disconnect time, its quality can be ranked lower than another exit node that is inferior in other attributes but is predicted to stay connected for a longer time. In another example, Logic Unit 112 might not choose an available exit node despite its good dynamic parameters because in the past it has changed its IP type often (e.g., from mobile to Wi-Fi and back) and the user request specifies mobile only or Wi-Fi only. In other words, Logic Unit 112 predicts potential violations of the minimal acceptable pool health threshold if a certain exit node is included and heuristically learns from it, i.e. it does not include that exit node in the pool or replaces the exit node with another one.

Once the initial group satisfies the minimal acceptable pool health threshold, Logic Unit 112 can choose to assign the pool to the user in step 615 and report success to Gateway 106 in step 617. A service provider may choose to a) begin service before a pool is fully formed and b) improve the pool's health during the service. In step 623, Logic Unit 112 can choose to make the exit nodes in that pool exclusive to that user or user's request. If this is done, then the exit nodes in this pool will not be served to another user or a request by the same user.

FIG. 6B represents the continuation of the exemplary flow diagram of exit node rotation with heuristic prediction. It continues with step 625 in which Logic Unit 112 predicts a violation of the minimal acceptable pool health threshold according to the PHRM. In other words, Logic Unit 112 predicts at t1 that a violation will occur at t2 and identifies the exit nodes with the lowest quality rating at t2. They will likely be the cause of the fall in the pool's health. Logic Unit 112 reports this prediction to Gateway 106. In step 627, Gateway 106 sends a request to Logic Unit 112 to replace the exit nodes. In step 629, Logic Unit 112 first checks whether exclusive exit nodes are available. If they are, they can be used to replace the current exit nodes with the lowest quality rating. However, if exclusive exit nodes are not found, they must be obtained from the set of all available and eligible exit nodes.

In step 631, Logic Unit 112 obtains candidate exit nodes. Candidate exit nodes are eligible exit nodes and when Logic Unit 112 makes a request for candidates to Exit Node Database 110, it can already specify criteria for exit node eligibility. In step 633, Logic Unit 112 checks whether any of the candidate exit nodes are exclusive to existing pools. If they are, they are discarded as candidates. In step 635, Logic Unit 112 engages in the ENQRM to determine which exit nodes would fit in which pools the best. In some embodiments, pool's request to replace exit nodes can be handled in succession, meaning that pools with predicted minimal acceptable pool health threshold violations would have their exit nodes replaced on a first-come first-served basis. However, such a procedure does not make sure that the exit nodes go to the most fitting pools. Thus, in one embodiment, all the pools requesting replacement are grouped and evaluated together.

In the latter case, step 635 would be delayed until batch results are returned (for example, batch delay time can be set at 1 second or any other interval by the service provider). Once batch results are returned, Logic Unit 112 has access to a batch of available candidate exit nodes and pools requesting exit node replacement. Logic Unit 112 then uses ENQRM to determine the improvement score of each exit node in each pool. For example, given every exit node in the batch and six pools that are predicted to violate the minimal acceptable pool health threshold, ENQRM calculates the improvement score of every exit node in each pool and determines the improvement score. The differences among improvement scores are the result of the current quality and composition of the pools, the parameters specified by User's Device 104, and every exit node's predicted performance. In one embodiment, the decision to include a particular exit node in a particular pool is made after all exit nodes are evaluated for all pools.

Step 635 can contain a flow of actions that is detailed in FIG. 5 (steps 501-515) which includes gathering data, aggregating data, recording data in the History Database 114, performing heuristic prediction based on the aggregated data, and recording the prediction results.

Once Logic Unit 112 decides which exit nodes improve which pools the most, it makes the decision to assign these exit nodes to these pools in step 637. The exit nodes are assigned to the pools in which they have the highest improvement score. If the same exit node has the highest score in more than one pool, it can be assigned to the pool in which it has a higher improvement score. It is extremely unlikely that improvement scores will be equal for any exit nodes or pools because of the complex initial conditions. However, an additional step can be devised that enacts priority rules based on the weight of attributes (e.g., predicted speed over predicted session length), the priority based on pool size, or other such criteria. The ENQRM can also be instructed to wait for the next round of test period if the results are undetermined. However, such additional steps do not change the overall functioning of the ENQRM or any of the embodiments more generally. If an exit node has negative values of its improvement score with all pools, it can be left unassigned to any pool. Negative values of improvement score means that an exit node would decrease pool health instead of increasing it.

Figure 7:
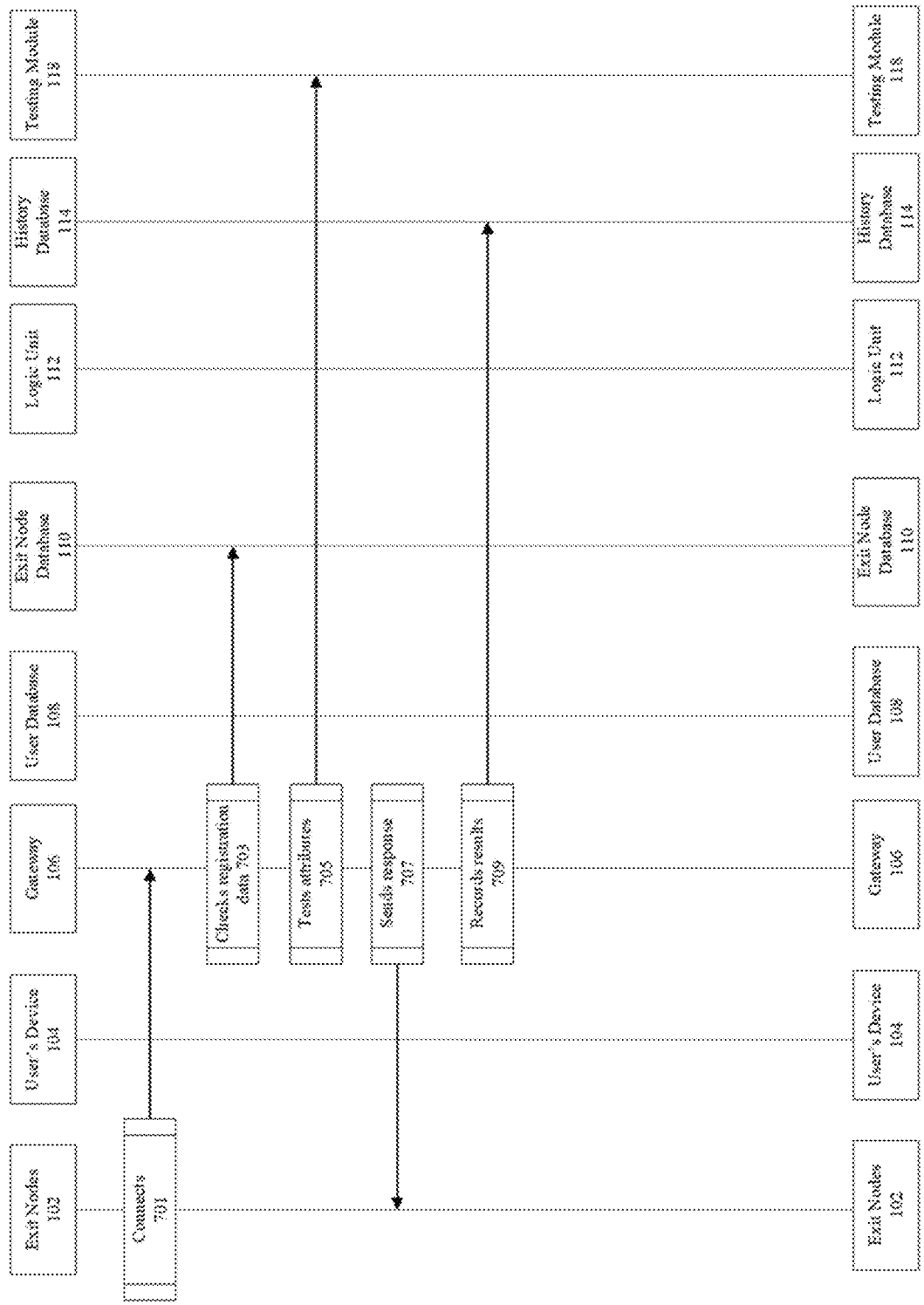
FIG. 7 shows an exemplary flow diagram of gateway response to an exit node's registration barriers.

FIG. 7 represents an exemplary flow diagram of gateway response to an exit node's barriers. In step 701, an exit node connects to the Gateway 106 by engaging the Exit Node Connection Kit contained in the exit node. Gateway 106 receives an exit node's request to connect to the Service Provider Infrastructure 120. In step 703, Gateway 106 checks criteria in the Exit Node Database 110 corresponding to the exit node that is trying to connect. For example, it can check such parameters as consent to participate in a distributed CDN access model, IP type, number of exit nodes with the same IP, registration status (active or disabled or banned), geolocation, and similar. A service provider can decide that some or all or any of these parameters are prohibiting factors, or barriers for connection to the Service Provider Infrastructure 120. For example, a service provider can decide that exit nodes from a particular country are not allowed to connect. In that case, after detecting that an exit node is from that country, in step 709, Gateway 106 sends a response message to the exit node (more specifically, to the Exit Node Connection Kit) with the instruction to disable connectivity to the Service Provider Infrastructure 120 for a certain amount of time or indeterminately.

The response types sent by Gateway 106 to an exit node's Exit Node Connection Kit can be instructions to continue working, completely disable the Exit Node Connection Kit, temporarily disable Exit Node Connection Kit's activity, disable Exit Node Connection Kit's activity until further requested or similar instructions. In at least one of the embodiments, a response (step 709) can be sent immediately after checking the registration data (step 703). In other words, if a barrier to entry is detected earlier in the action flow, intermediary steps can be omitted to save testing activities.

The order in which the barriers are tested can also be important. For example, Gateway 106 can choose to test the geolocation, then the consent to participate in a distributed CDN access model, then the IP type of the exit node and send a response (step 709) after any violations of the barriers without checking the rest of them.

In at least one embodiment, if all of the barriers are passed during the registration phase in step 703, then, in step 705, Gateway 106 addresses Testing Module 118 to perform tests on the dynamic features or measurements of the exit node's performance, such as response time, latency, bandwidth, battery life, or any combination thereof. Service provider can decide that some or all or any of the dynamic parameters also constitute a barrier for entry and thus send a response to an exit node to continue working, completely disable the Exit Node Connection Kit, temporarily disable the Exit Node Connection Kit's activity, disable Exit Node Connection Kit's activity until further requested or similar instructions. For example, a service provider can decide that it will not accept exit nodes with less than 5% battery life or with less than 1 mbps (megabytes per second) bandwidth. In that case, if such barriers are not met, in step 707, Gateway 106 sends a response with instructions to completely disable the Exit Node Connection Kit, temporarily disable Exit Node Connection Kit's activity, disable Exit Node Connection Kit's activity until further requested, or similar instructions.

If an exit node fulfills all barriers, Gateway 106 sends a positive response to the Exit Node Connection Kit to allow further connectivity to the Service Provider Infrastructure 120. A positive response from Gateway 106 allows to execute the Exit Node Connection Kit's connectivity functions and to participate in exit node pools, service user's requests and similar functions.

In step 709, Gateway 106 records the results it gathered about an exit node in Exit Node Database 110, including an exit node's registration data (consent to participate in a distributed CDN access model, IP type, number of exit nodes with the same IP, registration status (active or disabled or banned), geolocation, and similar) and test results (response time, latency, bandwidth, battery life, and others). Step 709 is enacted despite the type of instructions sent by Gateway 106 to the Exit Node Connection Kit's. More specifically, if a negative response is already sent in step 703, then testing of dynamic attribute is skipped (step 705)

and response is sent immediately (707) and after that or simultaneously the results are recorded by Gateway 106 in Exit Node Database 114.

When Gateway 106 sends a response with instructions to disable Exit Node Connection Kit or any of its functionality, the response can contain instructions about how long the cooldown period should be. Cooldown period signifies the period during which the Exit Node Connection Kit is not allowed to connect to the Service Provider Infrastructure 120. Exit Node Connection Kit can be scheduled to periodically retry connection and initiate the flow of actions, represented in FIG. 7 or it can be designed to only do so when the cooldown period has elapsed.

Figure 8:
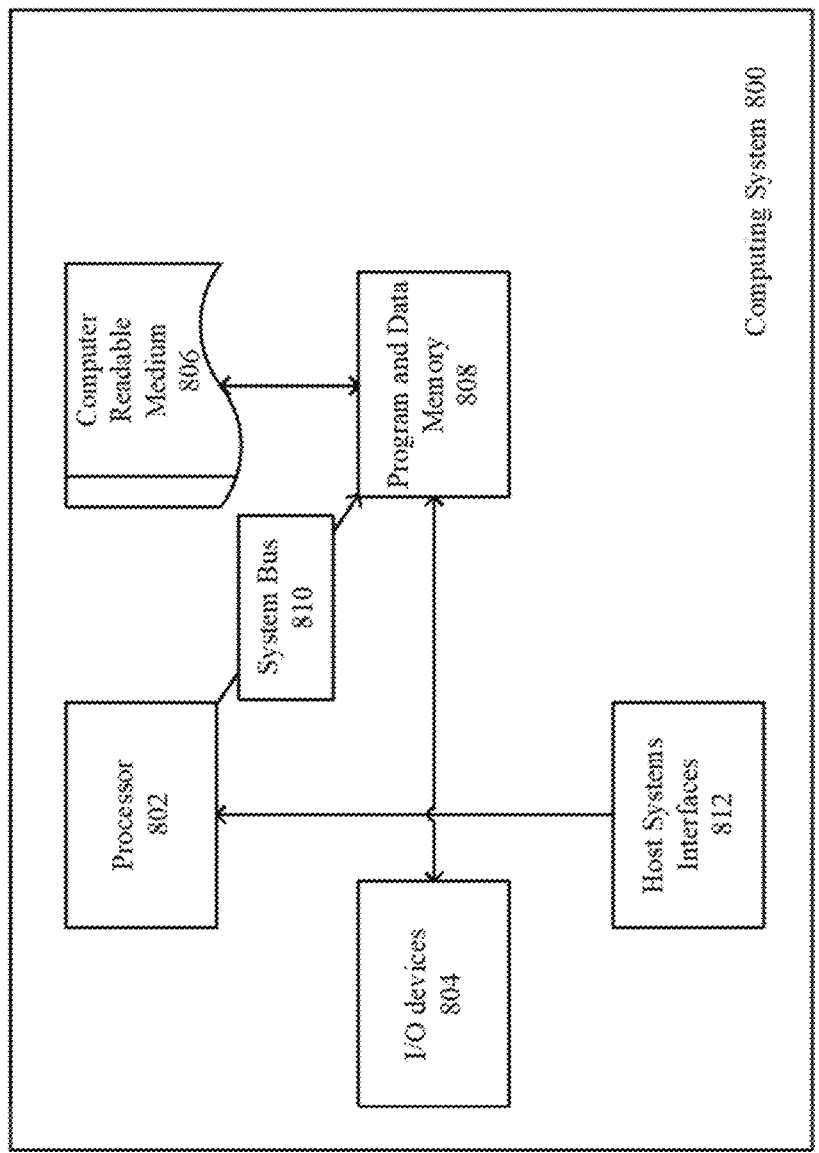
FIG. 8 shows a block diagram of an exemplary computing system.

The embodiments herein may be combined in a variety of ways as a matter of design choice. Accordingly, the features and aspects herein are not intended to be limited to any particular embodiment. Furthermore, the embodiments can take the form of hardware, firmware, software, and/or combinations thereof. In one embodiment, such software includes but is not limited to firmware, resident software, microcode, etc. FIG. 8 illustrates a computing system 800 in which a computer readable medium 806 may provide instructions for performing any of the methods and processes disclosed herein.

Furthermore, some aspects of the embodiments herein can take the form of a computer program product accessible from the computer readable medium 806 to provide program code for use by or in connection with a computer or any instruction execution system. For the purposes of this description, the computer readable medium 806 can be any apparatus that can tangibly store the program code for use by or in connection with the instruction execution system, apparatus, or device, including the computing system 800.

The computer readable medium 806 can be any tangible electronic, magnetic, optical, electromagnetic, infrared, or semiconductor system (or apparatus or device). Some examples of a computer readable medium 806 include solid state memories, magnetic tapes, removable computer diskettes, random access memories (RAM), read-only memories (ROM), magnetic disks, and optical disks. Some examples of optical disks include read only compact disks (CD-ROM), read/write compact disks (CD-R/W), and digital versatile disks (DVD).

The computing system 800 can include one or more processors 802 coupled directly or indirectly to memory 808 through a system bus 810. The memory 808 can include local memory employed during actual execution of the program code, bulk storage, and/or cache memories, which provide temporary storage of at least some of the program code in order to reduce the number of times the code is retrieved from bulk storage during execution.

Input/output (I/O) devices 804 (including but not limited to keyboards, displays, pointing devices, I/O interfaces, etc.) can be coupled to the computing system 800 either directly or through intervening I/O controllers. Network adapters may also be coupled to the computing system 800 to enable the computing system 800 to couple to other data processing systems, such as through host systems interfaces 812, printers, and/or or storage devices through intervening private or public networks. Modems, cable modems, and Ethernet cards are just examples of network adapter types.

Although several embodiments have been described, one of ordinary skill in the art will appreciate that various modifications and changes can be made without departing from the scope of the embodiments detailed herein. Accordingly, the specification and figures are to be regarded in an illustrative rather than a restrictive sense, and all such modifications are intended to be included within the scope of the present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, and the like may be used solely to distinguish one entity or action from another entity or action without necessarily requiring or implying any actual such relationship or order between such entities or actions. The terms "comprises", "comprising", "has", "having", "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without additional constraints, preclude the existence of additional identical elements in the process, method, article, and/or apparatus that comprises, has, includes, and/or contains the element. The terms "a" and "an" are defined as one or more unless explicitly stated otherwise herein. The terms "approximately", "about" or any other version thereof, are defined as being close to as understood by one of ordinary skill in the art. A device or structure that is "configured" in a certain way is configured in at least that way, but may also be configured in ways that are not listed. For the indication of elements, a singular or plural form can be used, but it does not limit the scope of the disclosure and the same teaching can apply to multiple objects, even if in the current application an object is referred to in its singular form.

It will be appreciated that some embodiments describe the use of one or more generic or specialized databases (such as "Exit Nodes Database", or similar), that contains a collection of information that is organized so that it can be easily accessed, managed and updated. Computer databases typically contain aggregations of data records or files, in the current case, databases usually store different information and statistics about the proxies or exit nodes, information about utilization threshold of the exit node provider. Such databases can also contain information about the users, requests performed, networks used, exit nodes used, types of exit nodes requested and similar data. Databases are structured to facilitate the storage, retrieval, modification, and deletion of data in conjunction with various data-processing operations.

The Disclosure is provided to allow the reader to quickly ascertain the nature of the technical disclosure. It is submitted with the understanding that it will not be used to interpret or limit the scope or meaning of the claims. In addition, in the foregoing Detailed Description, it is demonstrated that multiple features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment.

What is claimed is:

1. A system for executing predictive ranking of individual exit nodes in an initial cluster of exit nodes and for assigning a pool of eligible exit nodes to a user device, the system comprising:
    at least one processor;
    a service provider infrastructure comprising at least a logic unit, operable to:
        retrieve the initial cluster of exit nodes from a first database, wherein the logic unit, prior to retrieving the initial cluster of exit nodes, receives a query to create the pool of eligible exit nodes;
        access a second database comprising at least service history information of the individual exit nodes in the initial cluster of exit nodes;
        predict pool health violations for the individual exit nodes relative to a minimum pool health threshold by engaging a pool health rating mechanism, and rank the individual exit nodes based on the pool health violations predicted;
        decide which of the individual exit nodes should be replaced in the initial cluster based on the pool health violations;
        assemble the pool of eligible exit nodes from the initial cluster of exit nodes and assign the pool of eligible exit nodes to the user device, wherein, upon assigning the pool of eligible exit nodes, the logic unit transmits a success message to a gateway.

2. The system of claim 1, wherein the logic unit receives the query to create the pool of eligible exit nodes from the gateway, and wherein the query is formulated by the gateway.

3. The system of claim 2, wherein the query formulated by the gateway reflects a set of user-requested parameters specified in a service level agreement between the user device and the service provider infrastructure.

4. The system of claim 3, wherein the gateway, prior to formulating the query, registers the set of user-requested parameters in a database in the service provider infrastructure.

5. The system of claim 1, wherein the logic unit, upon accessing the second database, checks at least a relation of exclusiveness between the individual exit nodes of the initial cluster and a plurality of eligible pools of exit nodes previously assembled by the logic unit.

6. The system of claim 1, wherein the logic unit predicts the pool health violations for the individual exit nodes by analyzing criteria of at least one, or a combination, of:
    frequency, intervals, and schedule at which static parameters of the individual exit nodes are changed (including at least one of geolocation of exit nodes, internet protocol (IP) type, consent to participate in content delivery network (CDN), or combination thereof),
    dynamic parameters of the individual exit nodes (including at least one of time seen, session duration, activity timestamps, total traffic, traffic over time, response time, latency, connection to target, battery life, geographical location, connection and IP type, consent to participate in a distributed CDN access model, or combinations thereof);
    aggregated dynamic parameters of the individual exit nodes (including at least one of average speed, average session duration and timestamps, average traffic, average response time, average latency, most/least visited targets, error rate with a particular target, or combinations thereof);
    the server service history of the individual exit nodes (including at least one of total eligible pools per period, total users, total idle connection time, total pool time, average pool time, average pool change rate, average pool health, or combinations thereof).

7. The system of claim 6, wherein the logic unit analyzes the at least one, or a combination, of the criteria by accessing the second database.

8. The system of claim 1, wherein the logic unit, the first database, the second database, and the gateway are part of the service provider infrastructure.

9. The system of claim 1, wherein the pool of eligible exit nodes assigned to the user device by the logic unit are considered exclusive to the user device and utilized for servicing queries originating from the user device.

10. A computer-implemented method of predictive ranking of individual exit nodes in an initial cluster of exit nodes and of assigning a pool of eligible exit nodes to a user device, the method comprising:
    retrieving the initial cluster of exit nodes from a first database, wherein the retrieval of the initial cluster is triggered by a query to assemble the pool of eligible exit nodes;
    accessing a second database comprising at least service history information of the individual exit nodes in the initial cluster of exit nodes;
    predicting pool health violations for the individual exit nodes relative to a minimum pool health threshold by engaging a pool health rating mechanism, and ranking the individual exit nodes based on the pool health violations predicted;
    deciding which of the individual exit nodes should be replaced in the initial cluster based on the pool health violations;
    creating the pool of eligible exit nodes from the initial cluster of exit nodes and assigning the pool of eligible exit nodes to the user device, wherein, upon assigning the pool of eligible exit nodes, generating a success message.

11. The method of claim 10, wherein the query to create reflects a set of user-requested parameters specified in a service level agreement between the user device and a service provider infrastructure.

12. The method of claim 11, wherein the service provider infrastructure manages the individual exit nodes present in the initial cluster.

13. The method of claim 11, wherein the service provider infrastructure registers the set of user-requested parameters in a database, and wherein the database is part of the service provider infrastructure.

14. The method of claim 10, wherein upon accessing the second database, checks at least a relation of exclusiveness between the individual exit nodes of the initial cluster and a plurality of eligible pools of exit nodes previously assembled.

15. The method of claim 10, wherein the logic unit predicts pool health violations for the individual exit nodes by analyzing criteria of at least one, or a combination, of:
    frequency, intervals, and schedule at which static parameters of the individual exit nodes are changed (including at least one of geolocation of exit nodes, internet protocol (IP) type, consent to participate in content delivery network (CDN), or combinations thereof),
    dynamic parameters of the individual exit nodes (including at least one of time seen, session duration, activity timestamps, total traffic, traffic over time, response time, latency, connection to target, battery life, geographical location, connection and IP type, consent to participate in a distributed CDN access model, or combinations thereof);

aggregated dynamic parameters of the individual exit nodes (including at least one of average speed, average session duration and timestamps, average traffic, average response time, average latency, most/least visited targets, error rate with a particular target, or combinations thereof);

the server service history of the individual exit nodes (including at least one of total eligible pools per period, total users, total idle connection time, total pool time, average pool time, average pool change rate, average pool health, or combinations thereof).

16. The method of claim 15, wherein the at least one, or a combination, of the criteria is available within in the second database.

17. The method of claim 10, wherein the pool of eligible exit nodes assigned to the user device are considered exclusive to the user device and utilized for servicing queries originating from the user device.

\* \* \* \* \*